United States Patent [19]

Nakasaka et al.

[11] Patent Number: 5,929,934
[45] Date of Patent: Jul. 27, 1999

[54] KEY SIGNAL PROCESSING APPARATUS FOR VIDEO SIGNAL PROCESSING

[75] Inventors: Chikatomo Nakasaka; Tsutomu Takamori, both of Kanagawa, Japan

[73] Assignee: Sony Corporation, Tokyo, Japan

[21] Appl. No.: 08/933,580

[22] Filed: Sep. 19, 1997

Related U.S. Application Data

[62] Division of application No. 08/405,158, Mar. 16, 1995, Pat. No. 5,793,440.

[30] Foreign Application Priority Data

Mar. 18, 1994 [JP] Japan .................................. 6-074217

[51] Int. Cl.$^6$ ...................................................... H04N 9/74
[52] U.S. Cl. ........................... 348/590; 348/593; 348/597
[58] Field of Search ..................................... 348/590, 593, 348/597; H04N 9/74

[56] References Cited

U.S. PATENT DOCUMENTS 4,961,114 10/1990 White ...................... 348/597

*Primary Examiner*—Sherrie Hsia
*Attorney, Agent, or Firm*—Frommer Lawrence & Haug, LLP; William S. Frommer; Dennis M. Smid

[57] ABSTRACT

A key signal processing apparatus for video signal processing including a signal delay circuit for successively delaying by 1 clock units a key input signal, used for applying a special effect to a video signal, and outputting the delayed key signal; a signal selection circuit for receiving the key input signal and a plurality of delayed key signals output from the signal delay circuit and selecting based on a selection control signal two pairs of signals in predetermined relationships of delay; a first signal interpolation circuit for performing signal interpolation on the first pair output from the signal selection circuit using a first coefficient; a second signal interpolation circuit for performing signal interpolation on the second pair output from the signal selection circuit using a second coefficient; and a signal synthesization circuit for combining a signal from the output of the first signal interpolation circuit and the output of the second signal interpolation circuit and outputting it as a key signal for video signal processing.

7 Claims, 26 Drawing Sheets

INA

INB

OUT30
AK+B(1-K)
(WHERE K=1/2)

INA

INB

OUTPUT IN MODE 0
OUT 40

OUTPUT IN MODE 1
OUT 40

INPUT A

INPUT B

OUTPUT
(MODE 0)

INA-1

INA-2

INA-3

INA-4

INB

OUTPUT

SOFTENED BORDERLINE

SOFTENED DROP-BORDER

KEY IN

1H DELAY

2H DELAY

3H DELAY

4H DELAY

KEY SIGNAL
MODIFICATION
CIRCUIT 1
OUTPUT

KEY SIGNAL
MODIFICATION
CIRCUIT 2
OUTPUT

KEY SIGNAL
MODIFICATION
CIRCUIT 3
OUTPUT

KEY SIGNAL
MODIFICATION
CIRCUIT 4
OUTPUT

MULTIPLIER 1 OUTPUT

MULTIPLIER 2 OUTPUT

MULTIPLIER 3 OUTPUT

MULTIPLIER 4 OUTPUT

CMV OUT

MULTIPLIER 1 OUTPUT
OF SECOND IC

MULTIPLIER 2 OUTPUT

MULTIPLIER 3 OUTPUT

MULTIPLIER 4 OUTPUT

CMV OUT OF SECOND IC

KEY SIGNAL MODIFICATION
CIRCUIT 1 OUTPUT

CIRCUIT 2 OUTPUT

CIRCUIT 3 OUTPUT

CIRCUIT 4 OUTPUT

OUTPUT OF KEY SIGNAL MODIFICATION CIRCUITS 1 TO 4 IN FIRST IC

MULTIPLIER 1 OUTPUT

MULTIPLIER 2 OUTPUT

MULTIPLIER 3 OUTPUT

MULTIPLIER 4 OUTPUT

OUTPUT OF MULTIPLIERS 1 TO 4 IN FIRST IC

CMV OUT OF FIRST IC

MULTIPLIER 1 OUTPUT

MULTIPLIER 2 OUTPUT

MULTIPLIER 3 OUTPUT

MULTIPLIER 4 OUTPUT

OUTPUT OF MULTIPLIERS 1 TO 4 IN FINAL IC

OUTPUT OF SIGNAL SYNTHESIZATION CIRCUIT 1 IN FINAL IC

CMV OUT IN FINAL IC

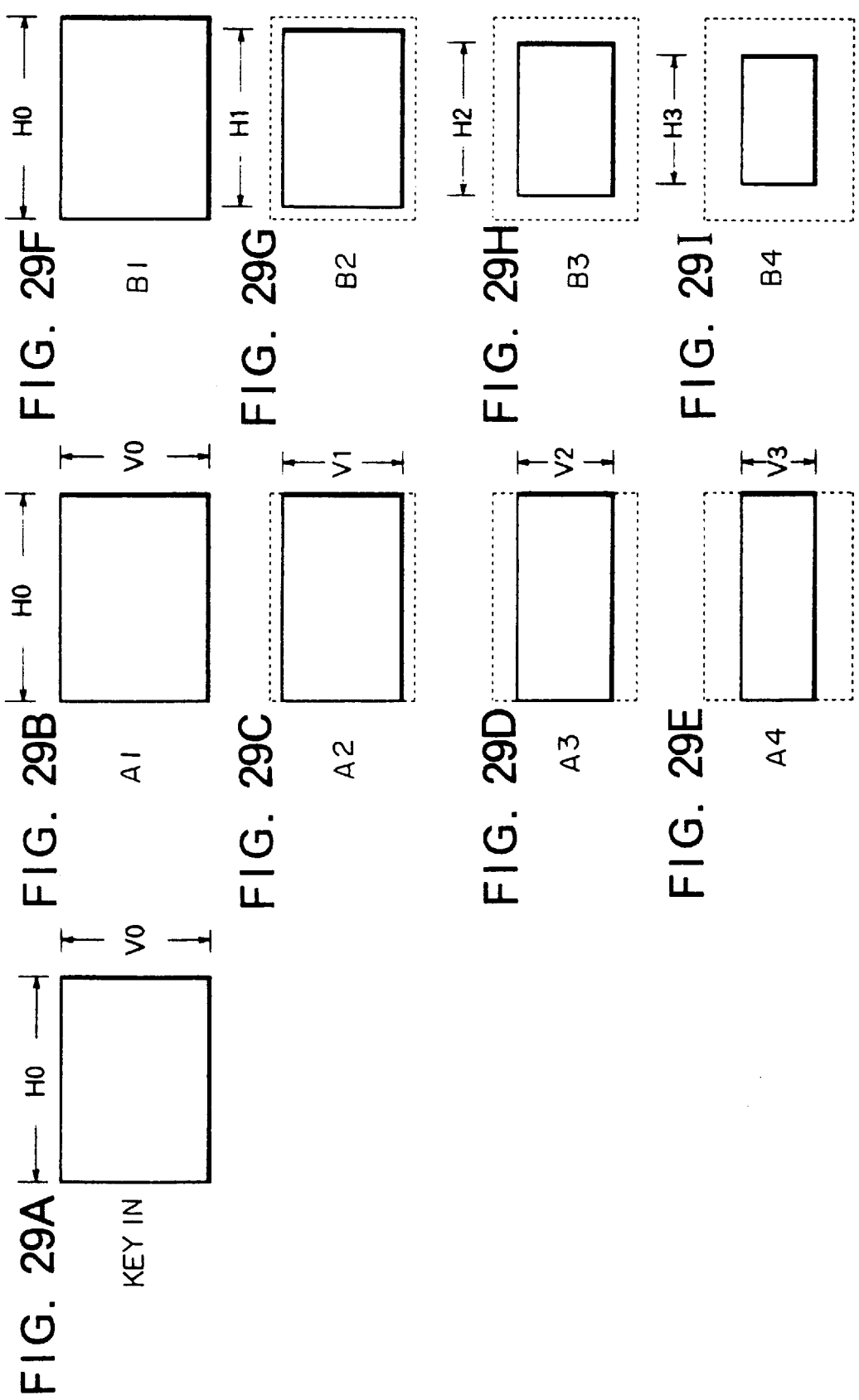

C1

C2

C3

C4

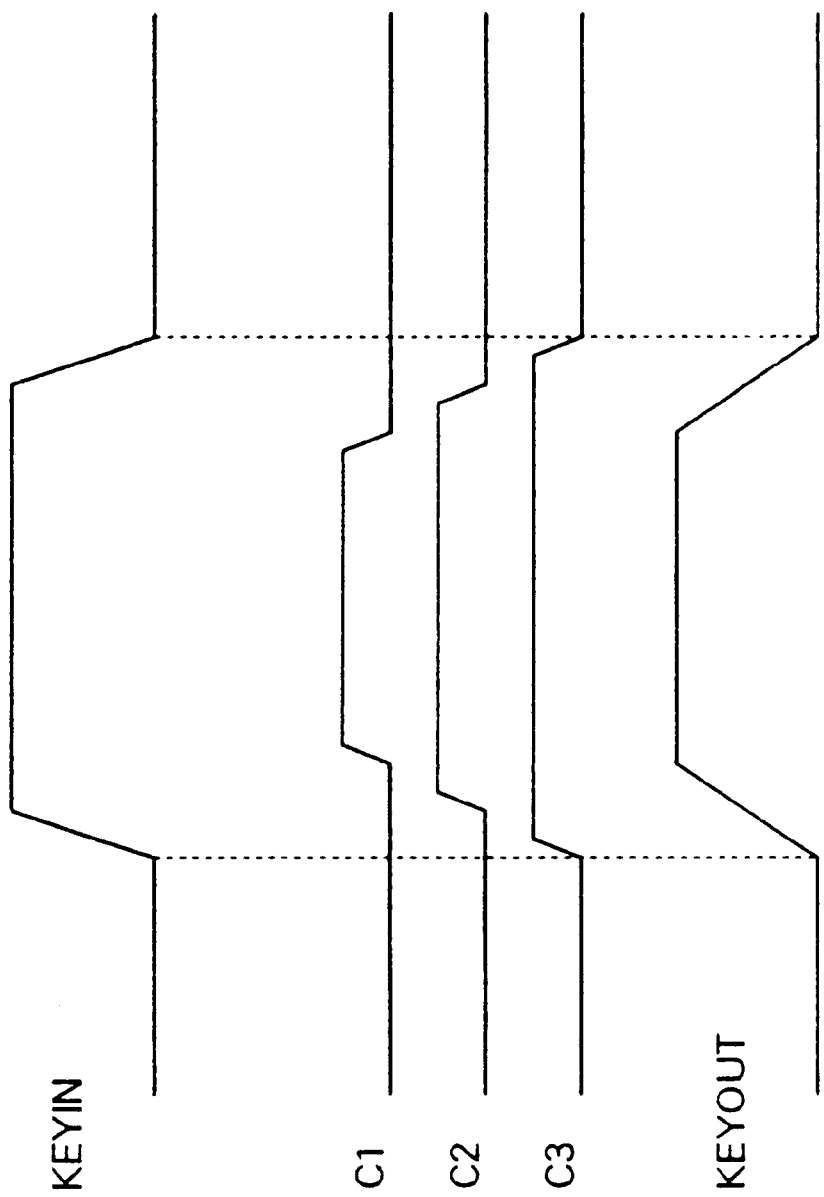
FIG. 31A  KEYIN
FIG. 31B  C1
FIG. 31C  C2
FIG. 31D  C3
FIG. 31E  KEYOUT

KEY SIGNAL PROCESSING APPARATUS FOR VIDEO SIGNAL PROCESSING

This application is a division of application Ser. No. 06/405,158, filed Mar. 16, 1995, U.S. Pat. No. 5,793,440.

BACKGROUND OF THE INVENTION

1. Field of the Invention

The present invention relates to a key signal processing apparatus for video signal processing used in digital video signal switchers etc. for processing a key signal for giving a special effect to a video signal.

The present invention more particularly relates to a key signal processing apparatus for video signal processing which produces a key signal enabling a special effect at a sub-pixel size smaller than an interval between pixels.

The present invention further particularly relates to a key signal processing apparatus for video signal processing suitable for processing a key signal enabling softened borderline, a key signal enabling softened drop-border, etc.

Further, the present invention relates to a key signal processing apparatus for video signal processing able to be configured as an IC circuit suitable for multiple-processing (composition) of key signals.

More specifically, the present invention relates to a key signal processing apparatus for video signal processing suitable for producing a key signal for defocusing a video signal.

2. Description of the Related Art

In a digital video signal switcher, a video signal is given various special effects. These special effects include for example borderlines, drop-borders, shadows, outlines, etc. Key signals are used for applying such special effects. Various kinds of processing need to be performed on key signals according to the special effects.

When applying sophisticated special effects, special effects less than the pixels of the video signal, that is, special effects of the sub-pixel level, are demanded. In the past, however, no circuit (apparatus) of a simple configuration was known for effectively processing key signals for such special effects.

Further, in the past, when synthesizing a signal from two key signals, for example, when performing positive non-additive mixing (NAM) computation for increasing the pulse width of a key signal, if the times (phases) of the two key signals were too far apart, then the result would be the same as with output of the two key signals separately and the pulse width of the key signal could not be increased as desired, that is, the desired signal synthesization could not be performed.

There is still not known any key signal processing apparatus for video signal processing suitable for processing a key signal enabling softened borderline or a key signal enabling softened drop-border, which are expansions of such processing.

Furthermore, a key signal processing apparatus for video signal processing of a configuration suitable for complex (multiple) and effective processing of key signals such as softened borderline or softened drop-border has not been known either.

Also, a key signal processing apparatus for video signal processing which can produce a key signal when a special effect for giving smooth borderlines is required, has not been known either.

Further, a key signal processing apparatus for video signal processing which provides a smoothly changing defocused key signal has not been known either.

SUMMARY OF THE INVENTION

The first object of the present invention is to provide a key signal processing apparatus for video signal processing that enables, by a simple circuit configuration, the provision of a key signal which can realize special effects at a sub-pixel size less than a pixel size.

The second object of the present invention is to provide a key signal processing apparatus for video signal processing which enables effective signal synthesization even when the time difference (phase difference) of the two key signals to be synthesized is very large.

The third object of the present invention is to provide a key signal processing apparatus for video signal processing which simultaneously achieves the first object and second object.

The fourth object of the present invention is to provide a key signal processing apparatus for video signal processing suitable for producing a key signal enabling softened borderline or a key signal enabling softened drop-border.

The fifth object of the present invention is to provide a key signal processing apparatus for video signal processing of a configuration suitable for composition (multiple-processing) of the above processed key signals.

The sixth object of the present invention is to provide a key signal processing apparatus for video signal processing able to produce a key signal processed as above and giving smooth borderlines.

The seventh object of the present invention is to provide a key signal processing apparatus for video signal processing able to produce a smoothly changing defocused key signal.

According to a first aspect of the present invention for achieving the first to third objects, there is provided a key signal processing apparatus for video signal processing including, a signal delay circuit for successively delaying by 1-clock units a key input signal, used for applying a special effect to a video signal, and outputting the delayed key signals, a signal selection circuit for receiving the key input signal and a plurality of delayed key signals output from the signal delay circuit and selecting based on a selection control signal two pairs of signals in predetermined delayed relationships, a first signal interpolation circuit for performing signal interpolation on the first pair output from the signal selection circuit using a first coefficient, a second signal interpolation circuit for performing signal interpolation on the second pair output from the signal selection circuit using a second coefficient, and a signal synthesizing (mixing) circuit for synthesizing (mixing) a signal from the output of the first signal interpolation circuit and the output of the second signal interpolation circuit and outputting it as a processed key signal for video signal processing.

According to this aspect of the invention, the signal delay circuit gives a successive delay to the key input signal used for giving a specific effect to the video signal based on a clock corresponding to the transfer of the video signal and outputs a plurality of delayed key signals. Due to this, a plurality of delayed key signals are produced for relief when the phase difference is great at the time of phase adjustment and signal mixing. A desired two pairs of signals are selected by the signal selection circuit. As one pair of these signals, a pair of signals with a time difference of exactly one clock is selected. The first signal interpolation circuit and the second signal interpolation circuit perform interpolation on the selected pairs of signals and multiply them by coefficients. Due to this, a signal at a sub-pixel size of less than the pixel size is produced. In particular, interpolation to any value is possible to multiplication by a coefficient. The signal synthesization (mixing) circuit synthesizes the signal from the first result of signal interpolation and the second result of signal interpolation.

As the signal synthesization, for example, positive NAM (non-additive mixing) computation or negative NAM computation is performed.

The key signal obtained by this signal synthesization is subjected to one-dimensional processing.

According to a second aspect of the present invention for achieving the fourth object wherein three-dimensional key processing is required, there is provided a key signal processing apparatus for video signal processing including, a signal delay circuit for successively delaying by a time unit (1H line) corresponding to 1 horizontal synchronization period of the video signal a key input signal, used for applying a special effect to the video signal, and outputting a plurality of the key signals, a first direction signal adjustment unit which receives the key signal and the plurality of delayed key signals from the signal delay circuit, selects a pair of signals in a predetermined delayed relationship for a first direction of the video signal, and adjusts the pulse width of the signals for exactly a predetermined number of hierarchies (levels) for the first direction of the video signal for the selected signals;

a second direction signal adjustment unit which receives the results of the adjustment at the first direction signal adjustment unit and adjusts the pulse width of the signals for exactly a predetermined number of hierarchies (levels) for the second direction of the video signal in an orthogonal relation with the first direction;

a multiplication unit which multiplies a predetermined coefficient with the signal subjected to adjustment in the second direction for exactly the number of hierarchies (levels) of key signal processing; and a signal synthesizing (mixing) circuit which uses the results of multiplication of the number of hierarchies (levels) of key signal processing from the multiplication unit to synthesize a signal and outputs it as the processed key signal for video signal processing.

According to the second aspect of the invention, the signal delay circuit gives a successive delay of 1H lines to the key input signal used for giving a special effect to the video signal and outputs a plurality of delayed key signals. Due to this, delayed signals for relief when there is a time difference in the signal adjustment and signal composition are produced.

The first direction, for example, the vertical direction signal adjustment unit performs adjustment of the position in the vertical direction and adjustment of the pulse width of the key signal for the key signal in the vertical direction for exactly the number of hierarchies of key signal processing. That is, it receives the key input signal and the delayed key signals from the signal delay circuit, selects the pair of signals in a predetermined delayed relationship based on a vertical direction selection control signal, adjusts the position in the vertical direction for the selected signals for exactly the number of hierarchies of key signal processing, and adjusts the pulse width of the adjusted signals for exactly the number of hierarchies of key signal processing.

The second direction, for example, the horizontal direction signal adjustment unit performs adjustment of the position in the horizontal direction and adjustment of the pulse width of the key signal for the key signal in the horizontal direction for exactly the number of hierarchies of key signal processing. That is, it selects a pair of signals in a predetermined delayed relationship based on a horizontal direction selection control signal for the results of adjustment by the vertical direction signal adjustment unit, adjusts the position in the horizontal direction for the selected signals for exactly the number of hierarchies of key signal processing, and adjusts the pulse width of the phase (timing) adjusted signals for exactly the number of hierarchies of key signal processing.

The adjustment in the horizontal direction and the adjustment in the vertical direction are performed with the adjustment in the vertical direction first and adjustment in the horizontal direction on the results of signal adjustment reverse to that. Further, it is possible to perform the adjustment in the horizontal direction and adjustment in the vertical direction independently and combine the results.

The multiplication unit performs adjustment in the height direction for the result of adjustment in the horizontal direction and vertical direction as explained above. That is, the multiplication unit multiplies the signal adjusted in the vertical direction and adjusted in the horizontal direction by a predetermined coefficient for exactly the number of hierarchies of key signal processing.

The signal synthesizing circuit synthesizes a plurality of key signals adjusted in three-dimensions obtained in this way. As the signal synthesization, preferably, positive NAM computation or negative NAM computation is performed.

According to a third aspect of the present invention for achieving the fifth object, there is provided a key signal processing apparatus for video signal processing including, a selector for selecting and outputting a plurality of key input signals based on a selection control signal;

a plurality of key signal modification circuits which receive the key signals output from the selector and modify the waveforms of the key signals, each key signal modification circuit having:

a signal delay circuit for successively delaying by a time unit (1H line) corresponding to 1 horizontal synchronization period of the video signal a key input signal output from the selector and outputting a plurality of delayed key signals, a first direction signal adjustment unit which receives a key signal output from the selector and the plurality of delayed key signals from the signal delay circuit, selects a pair of signals in a predetermined delayed relationship for a first direction of the video signal, and adjusts the pulse width of the signals for exactly a predetermined number of hierarchies (levels) for the first direction of the video signal for the selected signals; and a second direction signal adjustment unit which receives the results of the adjustment at the first direction signal adjustment unit and adjusts the pulse width of the signals for exactly a predetermined number of hierarchies (levels) for the second direction of the video signal in an orthogonal relation with the first direction;

a multiplication unit which multiplies predetermined coefficients with the plurality of outputs of the plurality of key signal modification circuits; and a first signal synthesizing (mixing) circuit which synthesizes a signal from the plurality of the results of multiplication of the multiplication circuit.

Preferably, it is further comprised of a first delay circuit which receives the key signal subjected to processing at a previous stage of key signal processing apparatus for video signal processing and delays the same by exactly the time for computation required by the key signal modification circuit and the multiplication circuit;

a second delay circuit for delaying the selected key signal from the selector by exactly the computation time required for the key signal modification circuit and the multiplication circuit;

a switching circuit which selects the output of the first delay circuit or the output of the second delay circuit and applies the same to a second signal composition circuit; and a second signal synthesizing (mixing) circuit which synthesizes a signal from the results of the first signal synthesizing circuit and the output of the first delay circuit or the output of the second delay circuit selected by the switching circuit.

More preferably, the key signal processing apparatus for video signal processing of the third aspect for achieving the fifth object connects in cascade a required number of key signal processing apparatuses for video signal processing each comprised of the above-mentioned key signal processing apparatus for video signal processing. That is, the key signal processing apparatus for video signal processing of the present invention includes:

the first line delay circuit means, the first signal adjustment circuit means, a second line delay circuit means having a circuit configuration equivalent to the first line delay circuit means and having a plurality of delay circuits for receiving the outputs of a plurality of key signal modification circuits of a previous stage of a key signal processing apparatus for video signal processing having the first line delay circuit means and the first signal adjustment circuit means and giving a successive time delay corresponding to one line of the video signal; and a second signal adjustment circuit means having a circuit configuration equivalent to the first signal adjustment circuit means for receiving the plurality of delayed key signals delayed by the second line delay circuit means and receiving the output of the first signal composition circuit of the key signal processing apparatus for video signal processing as the processed key signal of the previous stage of key signal processing apparatus for video signal processing and performing second adjustment on these key signals.

According to this, by configuring the first signal adjustment circuit means and the second signal adjustment circuit means integrally as ICs, it becomes possible to connect the required number of ICs in cascade.

Preferably, use is made of the results of signal synthesization in the previous stage of signal adjustment circuit means for the next signal synthesization.

To achieve the sixth object, the apparatus of the fourth aspect preferably further includes a 2-line delay circuit for giving a 2-line delay to the output of the second signal synthesizing circuit of the first signal adjustment circuit means and a switching circuit for switching the output of the second signal synthesizing circuit of the first signal adjustment circuit means and the output of the 2-line delay circuit and applying the output to the second signal adjustment circuit means as a key signal of a previous stage of a key signal processing apparatus for video signal processing.

According to a fifth aspect of the present invention for achieving the seventh object, there is provided a key signal processing apparatus, that is, a key signal defocusing apparatus, including a signal delay circuit for successively delaying a key input signal for applying a special effect for defocusing a video signal based on a clock corresponding to the transfer of the video signal and outputting a plurality of delayed key signals;

a signal selection circuit for receiving the key input signal and the plurality of delayed key signals output from the signal delay circuit and selecting a plurality of pairs of signals in predetermined delayed relationships based on a selection control signal;

a first direction signal adjustment unit for adjusting the position of the selected plurality of pairs of signals in the first direction of the video signal and adjusting the pulse width of the adjusted signals;

a second direction signal adjustment unit for adjusting the position of the results of the plurality of pairs adjusted by the first direction signal adjustment unit in a second direction of the video signal orthogonal to the first direction and adjusting the pulse width of the adjusted signals;

a multiplication unit which multiplies predetermined coefficient with the plurality of pairs of results adjusted in the second direction; and a signal synthesizing (mixing) circuit which synthesizes a signal from the results of multiplication of the multiplication circuit.

Preferably, the signal synthesizing circuit has a circuit for performing positive NAM computations and negative NAM computations and these computations are performed based on a given mode signal.

BRIEF DESCRIPTION OF THE DRAWINGS

These and other objects and features of the present invention will be apparent from the following description of preferred embodiments with reference to the accompanying drawings, wherein:

FIGS. 3A to 3C are graphs showing the operation of the key signal adjustment circuit shown in FIG. 2, wherein FIG. 3A is a graph showing the change along with time of the first key signal output from the signal selection circuit of the key signal adjustment circuit of FIG. 1, FIG. 3B is a graph showing the amount of change along with time of the second key signal output by the signal selection circuit of the key signal adjustment circuit of FIG. 2, and FIG. 3C is a graph showing a result of interpolation of the signal interpolation circuit of the key signal adjustment circuit of FIG. 2;

FIGS. 5A to 5D are graphs showing the operation of the signal synthesization circuit shown in FIG. 4, wherein FIG. 5A is a graph showing the change along with time of the first key signal input to the signal synthesization circuit, FIG. 5B is a graph showing the amount of change along with time of the second key signal input to the signal synthesization circuit, FIG. 5C is a graph showing a result of synthesization of the signal synthesization circuit based on the first mode, and FIG. 5D is a graph showing a result of synthesization of the signal synthesization circuit based on the second mode;

FIG. 6B is a graph showing the amount of change along with time of a second key signal input to the signal synthesization circuit, and FIG. 6C is a graph showing the result of synthesization of a signal synthesization circuit based on the first mode;

FIGS. 7A to 7F are graphs showing the operation of signal synthesization by positive NAM computation for enlarging the width of the key signal, wherein FIG. 7A is a graph showing the amount of change along with time of a first key signal, FIGS. 7B to 7D are graphs showing the amount of change along with time of the first key signal delayed successively by unit clocks and graphs showing the amount of change along with time of a second key signal input, FIG. 7E is a graph showing the amount of change along with time of a second key signal, and FIG. 7F is a graph showing the result of synthesization of a signal synthesization circuit based on the first mode;

FIGS. 21A to 22D are graphs showing the results of processing of the key signal modification unit shown in FIG. 12 in the first key signal processing IC for video signal processing of FIG. 13;

FIGS. 22A to 22D are graphs showing the results of processing of the multiplication unit shown in FIG. 12 in the first key signal processing IC for video signal processing of FIG. 13;

FIGS. 29A to 29I are graphs of an example of the operation of the key signal defocusing apparatus shown in FIG. 27 and FIG. 28, wherein FIG. 29A is a graph of the key input signal, FIGS. 29B to 29E are graphs of the results of phase adjustment in the vertical direction, and FIGS. 29F to 29I are graphs of the results of phase adjustment in the horizontal direction;

FIGS. 30A to 30D are graphs of an example of the operation of the key signal defocusing apparatus shown in FIG. 27 and FIG. 28, wherein FIGS. 30A to 30D are graphs of the results of weighing by the multiplication circuit;

FIGS. 31A to 31E are graphs of the processing of the key signal defocusing apparatus of FIG. 27 and FIG. 28, wherein FIG. 31A is a graph of the key input signal, FIGS. 31B to 31D are graphs of the results of adjustment in the vertical direction in the vertical direction signal adjustment circuit and weighting in the multiplication circuit, and FIG. 31E is a graph of the results of signal synthesization in the signal synthesization circuit.

DESCRIPTION OF THE PREFERRED EMBODIMENTS

First Embodiment

A first embodiment of the key signal processing apparatus for video signal processing of the present invention will be first explained with reference to FIG. 1. The key signal processing apparatus for video signal processing of the first embodiment performs adjustment in one-dimension (adjustment of pulse width) on one key signal.

Figure 1:
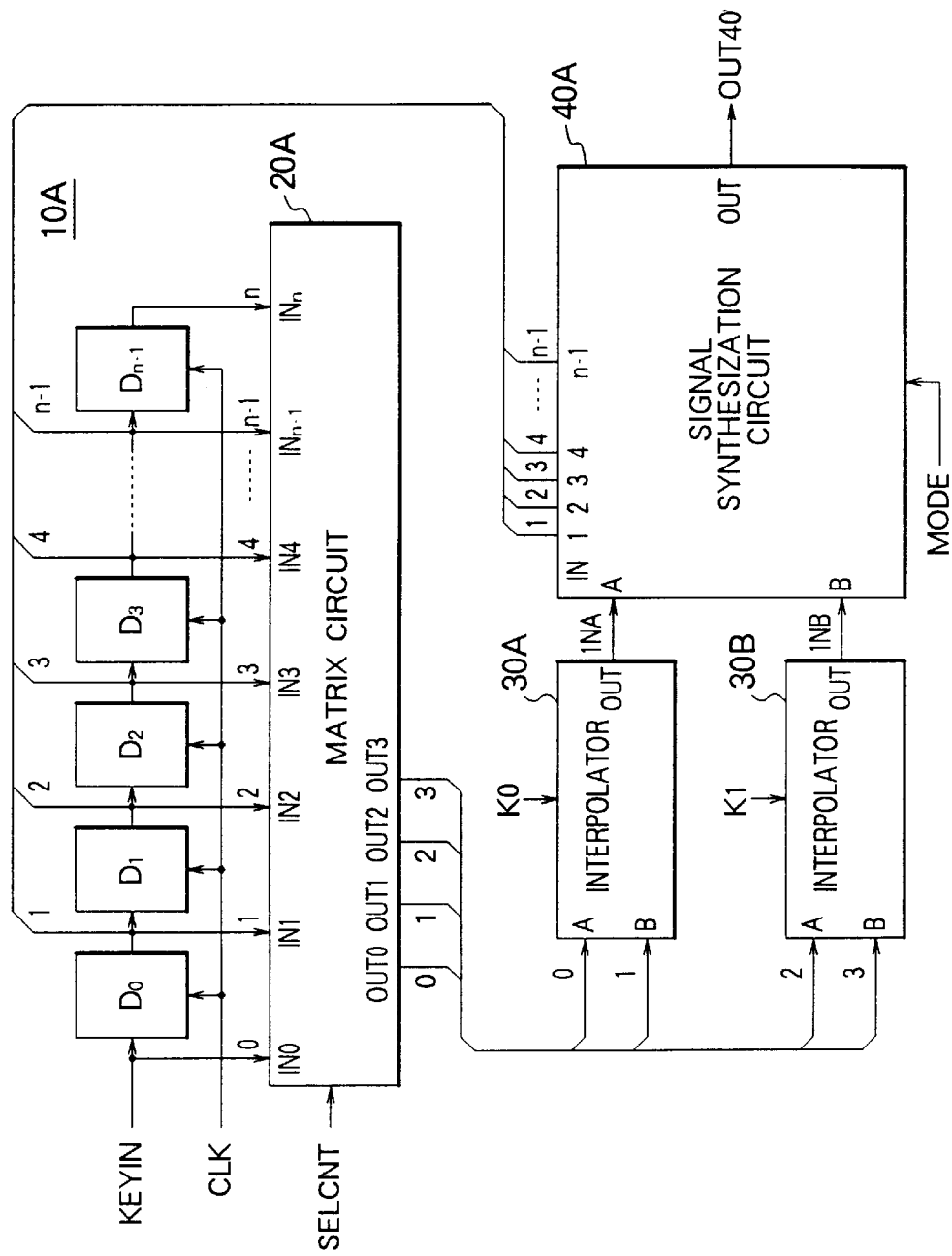
FIG. 1 is a view of the configuration of a first embodiment of a key signal processing apparatus for video signal processing of the present invention.

The key signal processing apparatus for video signal processing illustrated in FIG. 1 is provided with a key signal delay circuit 10A, a matrix circuit (signal selection circuit) 20A, a first signal interpolation circuit 30A, a second signal interpolation circuit 30B, and a signal synthesization (combination or mixing) circuit 40A.

Figure 2:
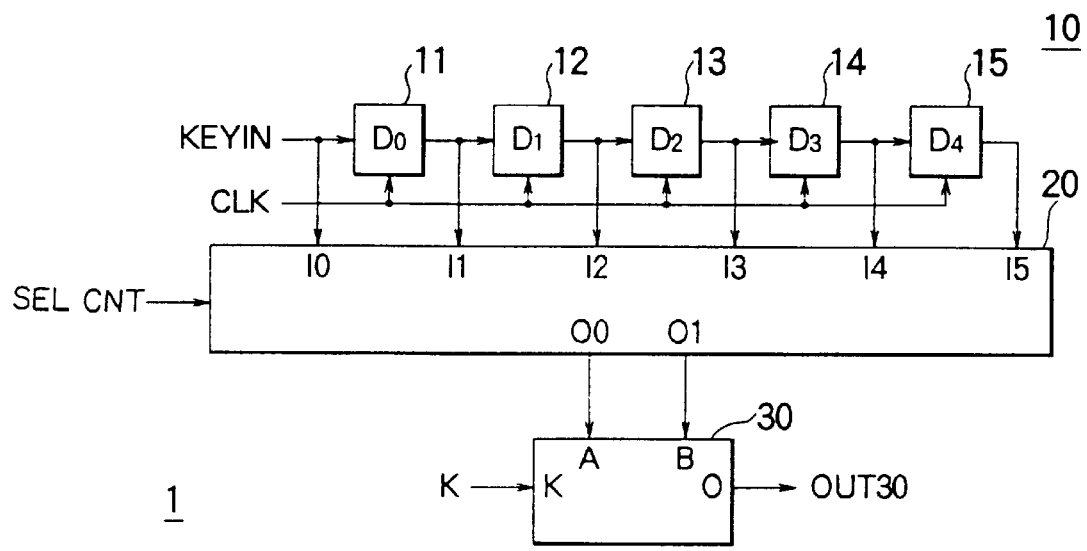
FIG. 2 is a view of the configuration of a key signal adjustment circuit in FIG. 1.

FIG. 2 is a view of the configuration of a key signal adjustment circuit for performing the most basic processing for processing one type of key signal.

The key signal adjustment circuit shown in FIG. 2 is comprised of the key signal delay circuit 10 shown in FIG. 1 which corresponds to the key signal delay circuit 10A and is shown with a simplified configuration, a signal selection circuit 20 which corresponds to the signal selection circuit 20A shown in FIG. 1 and is shown with a simplified configuration, and a signal interpolation circuit 30 which generically refers to the first signal interpolation circuit 30A and second signal interpolation circuit 30B shown in FIG. 1 and is shown with a simplified configuration.

From the above, the key signal processing apparatus for video signal processing shown in FIG. 1 is configured by a combination of the key signal adjustment circuit of FIG. 2 showing the basic configuration and the signal synthesization circuit 40A.

The basic operation of the adjustment of the key signal will be explained now referring to the key signal adjustment circuit shown in FIG. 2.

The key input signal KEYIN, which is a binary signal of white/black (or 0/1), is input to the key signal adjustment circuit.

The key signal delay circuit 10 has a plurality of unit clock delay circuits 11 to 15 which successively delay the key input signal KEYIN based on a clock CLK. One clock CLK corresponds to the time for transfer of one pixel of data of the video signal to be given a special effect using the key signal. Accordingly, the key input signal KEYIN input into the key signal delay circuit 10 is delayed in the unit clock delay circuits 11 to 15 successively by a delay time corresponding to one pixel's worth of the video signal.

The key signal delay circuit 10A shown in FIG. 1 is configured corresponding to the key signal delay circuit 10 shown in FIG. 2 and is comprised of a cascade connection of n number of delay circuits D0 to Dn-1 which successively delay by one clock CLK the key input signal KEYIN.

The signal selection circuit 20 receives as input the key input signal KEYIN itself and the key input signals KEYIN delayed successively by one clock each in the key signal delay circuit 10 and, based on a selection control signal SELCNT, selects a key input signal and a delayed key signal in any delayed relationship or a pair of delayed key signals in any delayed relationship, and outputs the same from the output terminals O0,O1.

In this embodiment, preferably, a pair of key signals of a one-clock delayed relationship are output from the output terminals O0, O1. If two signals separated by exactly one clock are selected, there is no large gap in the time difference of the two signals covered by the interpolation in the signal interpolation circuit 30 and, for example, a key signal is given which is advantageous in non-additive mixing (NAM) and other later computation. Below, in this embodiment, the explanation will be made of the case of selection and output of one pair of key signals in a one-clock delayed relationship.

Of course, the signal selection circuit 20 can select a pair of key signals of any delayed relationship in accordance with an instruction of the selection control signal SELCNT.

The matrix circuit 20A shown in FIG. 1, in the same way as the signal selection circuit 20 shown in FIG. 2, outputs two pairs of selected signals from the delayed key signals successively delayed in the key signal delay circuit 10A based on the selection control signal SELCNT. The first pair of selected signals are output from the output terminals OUT0 and OUT1 and are supplied to the first signal interpolation circuit 30A. The second pair of selected signals are output from the output terminals OUT2 and OUT3 and are applied to the second signal interpolation circuit 30B.

Note that in this embodiment, the two delayed key signals output from the output terminals OUT0 and OUT1 are deviated from each other by exactly one clock CLK. That is, the first pair of selected signals, namely, is, the first pair of the first selected signal and the second selected signal, are any delayed key signals separated by exactly one clock. Similarly, the two key signals output from the output terminals OUT2 and OUT3 are deviated from each other by exactly one clock CLK. That is, the second pair of selected signals, namely, the second pair of the first selected signal and the second selected signal, are any delayed key signals separated by exactly one clock.

The signal interpolation circuit 30 shown in FIG. 2 receives as input the pair of key signals selected and output in the signal selection circuit 20 and performs processing for interpolation of the two key signals.

The operation of the signal interpolation circuit 30 will now be explained with reference to FIGS. 3A to 3C.

Figure 3A:
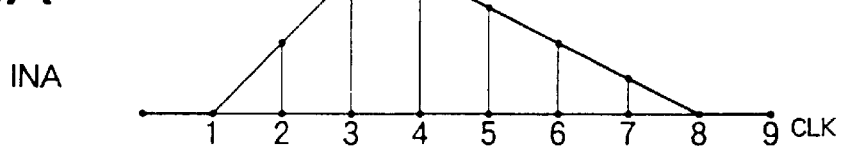
Figure 3B:
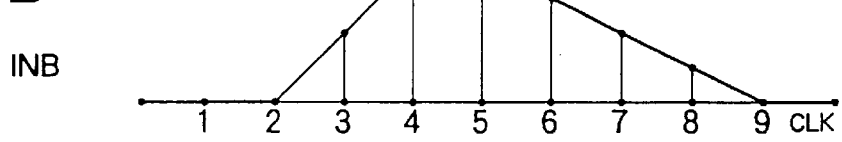
Figure 3C:
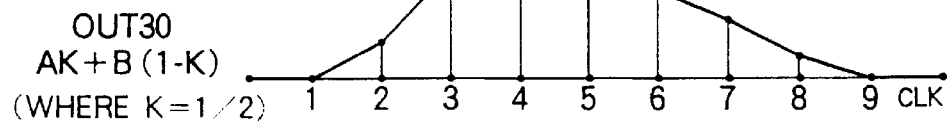

FIG. 3A is a graph showing the change along with time of the first key signal output from the signal selection circuit 20 of the key signal adjustment circuit of FIG. 2, FIG. 3B is a graph showing the amount of change along with time of the second key signal output by the signal selection circuit 20, and FIG. 3C is a graph showing a result of interpolation of the signal interpolation circuit 30. In FIGS. 3A to 3C, one gradation on the horizontal axis corresponds to one clock CLK of time.

The second key signal INB is delayed by exactly one clock CLK from the first key signal INA. This delayed relationship may be any relationship so long as the key input signal KEYIN and the output of the unit clock delay circuit 11 of the key signal delay circuit 10 or adjoining signals of the unit clock delay circuit 11 etc. are delayed by exactly one clock CLK. The selection is determined by the selection control signal SELCTL applied to the signal selection circuit 20.

The signal interpolation circuit 30 carries out a signal interpolation operation based on the following equation:

$$OUT30 = K \times INA + (1-R) \times INB \tag{1}$$

where, K is an interpolation coefficient,

INA is a first key signal,

INB is a second key signal, and

OUT30 is the result of interpolation.

FIG. 3C is a graph showing the result of interpolation OUT30 of the signal interpolation circuit 30 in the case of a coefficient K=0.5. Namely, the graph shown in FIG. 3C shows the waveform of the key signal obtained by averaging the first key signal INA and the second key signal INB in the case where the coefficient K=0.5. As a result, while both the first key signal INA and the second key signal INB were signals delayed by one clock CLK, they can be treated as values within one clock CLK. Since one clock corresponds to one interval (distance) between adjoining pixels, i.e., one pixel interval, a key signal of less than one pixel interval, that is, of the sub-pixel interval, is obtained by the interpolation. That is, the result of interpolation OUT30 means the interpolated key signal of the sub-pixel level obtained using the first key signal INA of the pixel interval and the second key signal INB of the pixel interval. In other words, the interpolation result OUT30 means the result of interpolation of the key input signal KEYIN of the pixel interval to the sub-pixel interval. The coefficient K may be suitably set, so the amount of adjustment of the signal may be adjusted by suitably setting the coefficient K.

In this way, the interpolation result OUT30 is adjusted not by each one clock CLK, but to a time less than one clock CLK, so it is possible to perform not special effect processing for each pixel as in the past, but special effect processing of the sub-pixel level less than one pixel.

How the key input signal KEYIN is adjusted is determined by the coefficient K and the pair of key signals selected by the signal selection circuit 20. In other words, the amount of signal adjustment is defined by the coefficient K and the selection control signal SELCTL.

The first signal interpolation circuit 30A shown in FIG. 1 uses the coefficient K0 for computation for interpolation of the first pair of the first selected signal and the second selected signal using K=K0 in equation 1. As a result, first signal adjustment is performed using the first pair of the first selected signal and the second selected signal in the first signal interpolation circuit 30A.

The second signal interpolation circuit 30B shown in FIG. 1 uses the coefficient K1 for computation for interpolation of the second pair of the first selected signal and the second selected signal using K=K0 in equation 1. As a result, second phase adjustment is performed using the second pair of the first selected signal and the second selected signal in the second signal interpolation circuit 30B.

This signal synthesization (mixing or combination) unit 40A shown in FIG. 1 is supplied with the first adjusted first key signal INA from the first signal interpolation circuit 30A and the second adjusted second key signal INB from the second interpolation circuit 30B and also delayed key signals delayed by one clock from the key signal delay circuit 10A.

Figure 4:
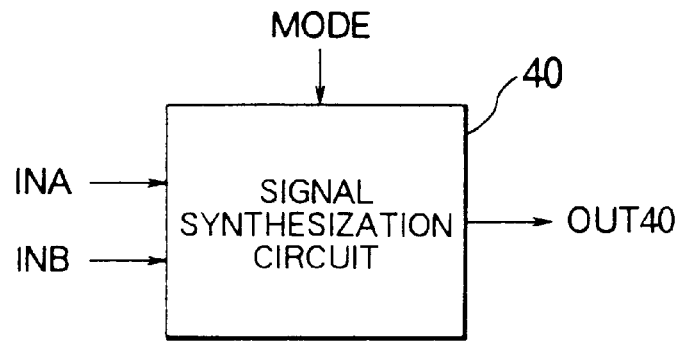
FIG. 4 is a view of the configuration of the signal composition circuit in FIG. 1.

FIG. 4 is a circuit diagram of the signal synthesization (mixing or combination) unit 40 which corresponds to the signal synthesization unit 40A shown in FIG. 1 but is simplified in configuration.

The signal synthesization circuit 40 receives as input the first key signal INA and the second key signal INB, synthesizes a signal based on the type of the mode signal MODE, and outputs the synthesized result OUT40.

Here, an explanation will be made of the types of the mode signal MODE and the content of the processing.

TABLE 1

| Type of mode | Name of mode | Content of processing of mode |
| --- | --- | --- |
| Mode 0 | Positive NAM computation | Selection and output of whichever of first key signal INA and second key signal INB has higher level |

TABLE 1-continued

| Type of mode | Name of mode | Content of processing of mode |
| --- | --- | --- |
| Mode 1 | Negative NAM coznputation | Selection and output of whichever of first key signal INA and second key signal INB has lower level |
| Mode 2 | First input selection output | Selection and output of first key signal INA |
| Mode 3 | Second input selection output | Selection and output of second key signal INB |

Figure 5A:
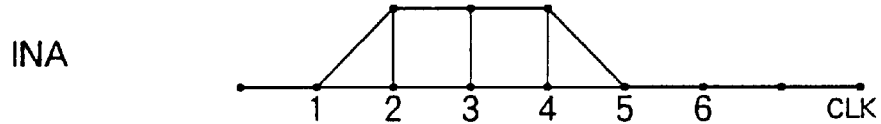
Figure 5B:
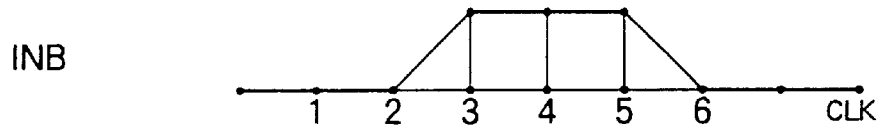
Figure 5C:
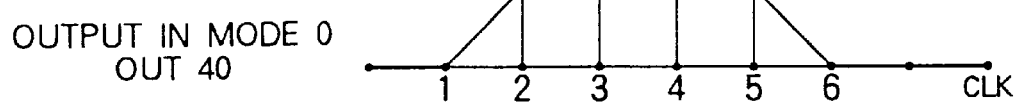
Figure 5D:
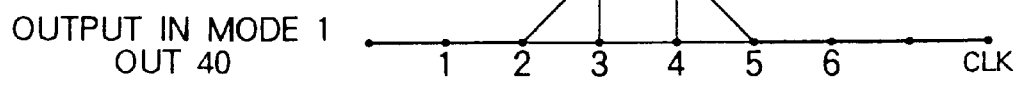

FIGS. 5A to 5D are graphs showing the operation of the signal synthesization circuit 40 shown in FIG. 4, wherein FIG. 5A is a graph showing the change along with time of the first key signal input to the signal synthesization circuit 40, FIG. 5B is a graph showing the amount of change along with time of the second key signal input to the signal synthesization circuit 40, FIG. 5C is a graph showing a synthesized result of the signal circuit 40 based on the first mode (mode 0), and FIG. 5D is a graph showing a synthesized result of the signal synthesization circuit 40 based on the second mode (mode 1).

If the key signal INA shown in FIG. 5A and the second key signal INB shown in FIG. 5B are used to synthesize a signal in the mode 0 (positive NAM computation) in the signal composition circuit 40, then, as shown in FIG. 5C, the pulse width of the synthesized result OUT40 becomes broader. Further, if a signal is synthesized in the mode 1 (negative NAM computation), then, as shown in FIG. 5C, the pulse width of the synthesized result OUT40 becomes narrower.

That is, by performing the signal synthesization of the mode 0 using the signal synthesization circuit 40, it is possible to enlarge the pulse width of the key signal and by performing the signal synthesization of the mode 1 (negative NAM computation), it is possible to narrow the pulse width of the key signal. Accordingly, by using a key signal synthesized in the mode 0, borderline processing, that is, thickening (enlarging) of the width of the video signal.is possible. Conversely, by using the key signal synthesized in the mode 1, it is possible to narrow the pulse width of the video signal.

Figure 6A:
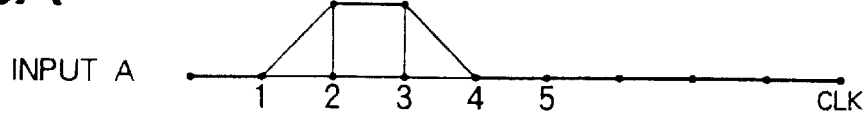
FIGS. 6A to 6C are graphs showing the operation of signal synthesization in a first mode in the case where the time difference between the two key signals is large, wherein FIG. 6) is a graph showing the amount of change along with time of a first key signal input to the signal synthesization circuit.
Figure 6B:
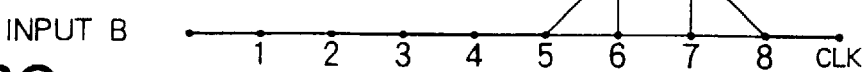
Figure 6C:
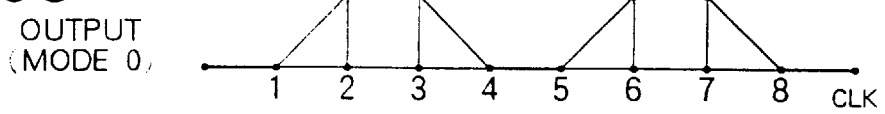

FIG. 6 is a graph showing another operation of the signal synthesization circuit 40 shown in FIG. 4, wherein FIG. 6A is a graph showing the amount of change along with time of a first key signal input to the signal synthesization circuit 40, FIG. 6B is a graph showing the amount of change along with time of a second key signal input to the signal synthesization circuit 40, and FIG. 6C is a graph showing the results of synthesization of a signal synthesization circuit 40 based on the first mode (mode 0: positive NAM computation).

The first key signal INA and the second key signal INB shown in FIGS. 6A and B are considerably different in time difference. As a result, if signal synthesization is performed by the mode 0 (positive NAM computation) in the signal synthesization circuit 40, signal synthesization between the first key signal INA and the second key signal INB to enlarge the width of the key signal cannot be performed and the synthesized result OUT40 becomes a discontinuous key signal comprised of merely the output of the first key signal INA and the second key signal INB. The key signal cannot be used for special effect processing.

To prevent this disadvantage in signal synthesization in the mode 0 (positive NAM computation) for a first key signal INA and a second key signal INB with such a large time difference, it is preferable to use a key signal obtained by delaying the key input signal KEYIN by a clock CLK in the case of the signal synthesization by the signal synthesization circuit 40 in the same way as explained with reference to FIG. 1 and FIG. 2. Therefore, the delayed key signals from the key signal delay circuit 10A shown in the key delay circuit 10A shown in FIG. 1 are supplied to the signal synthesization unit 40A shown in FIG. 1.

Figure 7A:
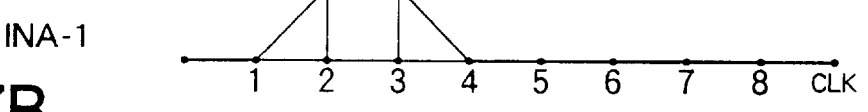
Figure 7B:
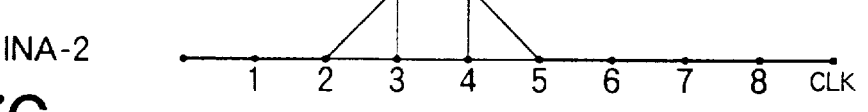
Figure 7C:
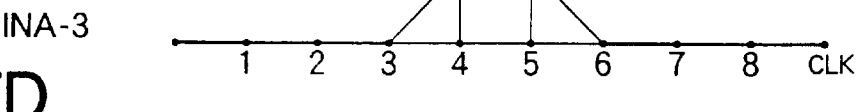
Figure 7D:
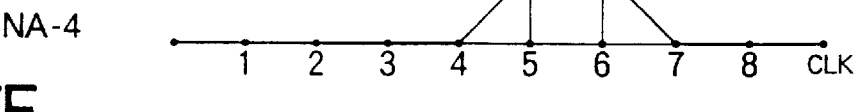
Figure 7E:
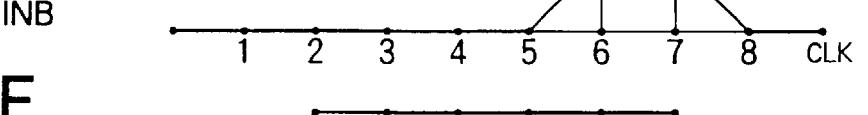
Figure 7F:
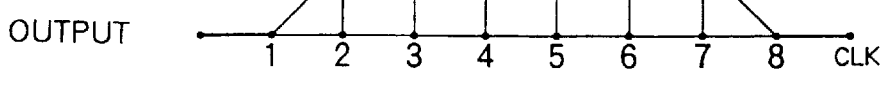

FIGS. 7A to 7F are graphs showing the signal synthesization in the key signal delay circuit 10A shown in FIG. 1. That is, FIGS. 7A to 7F are graphs showing the operation of signal synthesization in a first mode for enlarging the width of the key signal, wherein FIG. 7A is a graph showing the amount of change along with time of a first key signal INA-1, that is, the key input signal KEYIN, and FIGS. 7B to 7D are graphs showing the amount of change along with time of the first key signals INA-2 to INA-4 delayed successively by unit clocks. FIG. 7E is a graph showing the amount of change along with time of a second key signal INB. FIG. 7F is a graph showing the result of synthesization of the first key signals INA-1 to INA-4 shown in FIGS. 7A to 7D and the second key signal INB shown in FIG. 7E.

In this way, by combining the one-clock CLK delayed first key signal INA and second key signal INB, even if there is a time difference as illustrated in FIGS. 6A and 6B between the first key signal INA and the second key signal INB, the pulse widths of the key signals do not become discontinuous and it is possible to produce a signal with a broad pulse width comprised of consecutive key signals.

Figure 8:
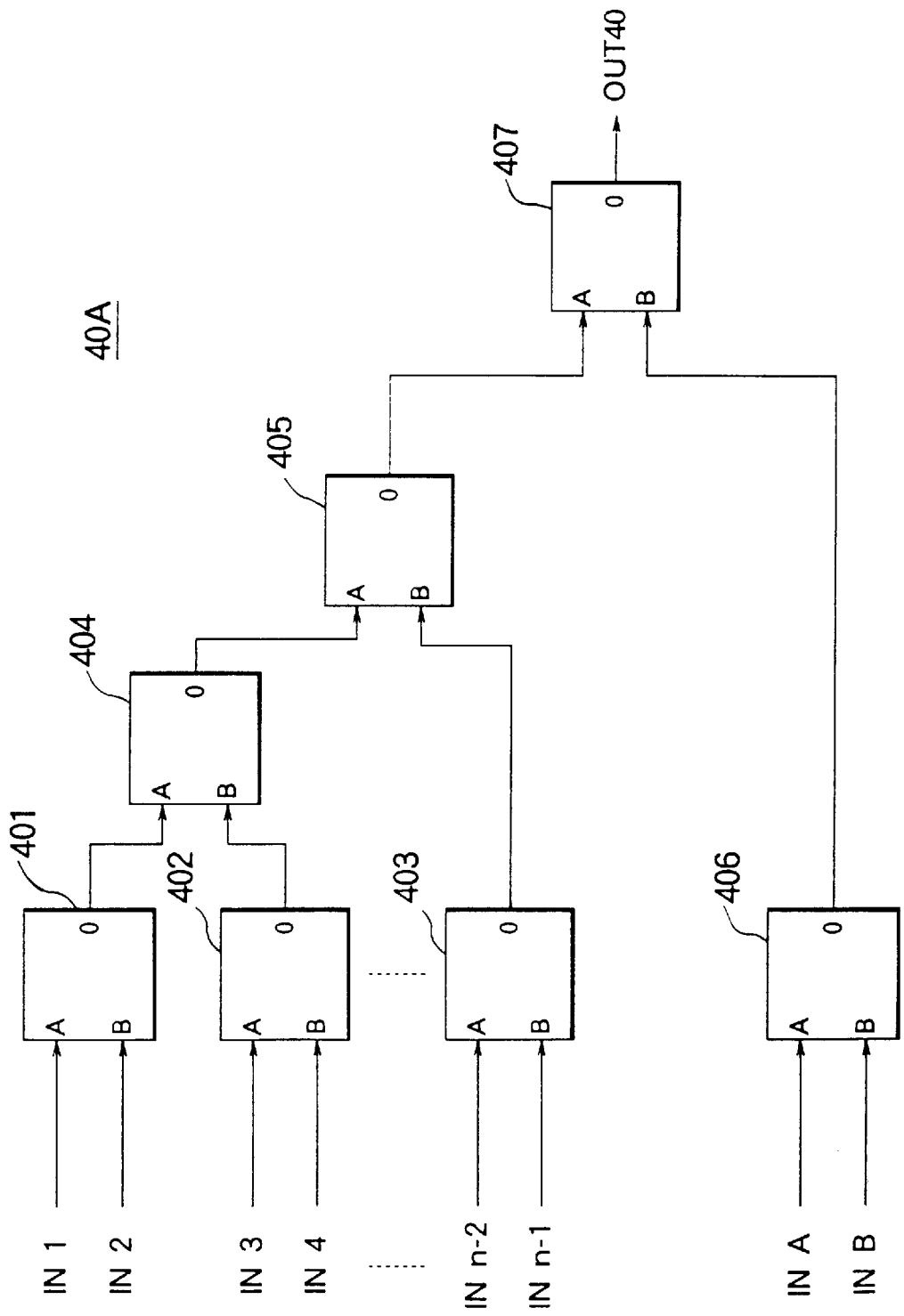
FIG. 8 is a view of the circuit configuration of the signal synthesization unit illustrated in FIG. 1.

FIG. 8 is a view of the configuration of the signal synthesization unit 40 illustrated in FIG. 1.

The signal synthesization unit 40A is comprised of the connected signal synthesization circuits 401 to 407 as illustrated. The operation of the signal synthesization circuits 401 to 407 is similar to that of the signal synthesization circuit 40 illustrated referring to FIG. 4.

The first signal synthesization circuit 401 performs signal synthesization from the input key signal IN1 of the second stage delay circuit $D_1$ of the key signal delay circuit 10A and the output key signal IN2 of the second delay circuit $D_1$ (input signal IN2 of third delay circuit $D_2$).

The signal synthesization here is signal synthesization of the mode 0 for enlarging the pulse width of the two signals (positive NAM computation). The signal synthesization circuits 402 to 403 also perform signal synthesization from the two delayed key signals deviated from each other by one clock in the mode 0 (positive NAM computation) in the same way as the signal synthesization circuit 401.

The signal synthesization unit 40A synthesizes a signal from the first adjusted first key signal INA from the first signal interpolation circuit 30A and the second adjusted second key signal INB from the second signal interpolation circuit 30B, but as explained with reference to FIG. 1, since use is made of delayed signals from the key signal delay circuit 10A, even if there is a large time difference as illustrated with reference to FIGS. 6A and 6B between the first adjusted first key signal INA from the first signal interpolation circuit 30A and the second adjusted second key signal INB from the second signal interpolation circuit 30B, it is possible to enlarge the width of the key input signal KEYIN.

The signal synthesization unit 40A is not limited to the mode 0 (positive NAM computation) illustrated in FIG. 8 and has circuits for performing other computations shown in Table 1. It can perform the various modes of computation shown in Table 1 in accordance with a mode signal MODE.

As explained above, by using the key signal processing apparatus for video signal processing of the first embodiment of the present invention illustrated in FIG. 1, it is possible to select any synthesization of first and second pairs of delayed key signals based on the selection control signal SELCNT in the matrix circuit 20A, perform signal interpolation based on the coefficient K0 and the coefficient K1 based on two pairs of delayed key signals selected in the first signal interpolation circuit 30 and second signal interpolation circuit 30B, and further synthesize a key signal interpolated in accordance with the mode designated by the mode signal MODE in the signal synthesization unit 40A.

The key signal processing apparatus for video signal processing of the first embodiment of the present invention is not limited to the above illustration and may take various modified forms.

For example, the matrix circuit 20A shown in FIG. 1 and the signal selection circuit 20 shown in FIG. 2 were illustrated with reference to the case of selection and output of a pair of key signals of a one-clock delayed relationship, but the invention is not limited to selection of a pair of key signals separated by one clock. It is also possible to set to any value the selection control signal SELCNT and select and output key signals separated by any time, for example, in a two-clock delayed relationship.

Further, the key signal delay circuit 10A of FIG. 1 and key signal delay circuit 10 of FIG. 2 were explained with reference to the case of cascade connection of the unit delay circuits (basic units), but it is also possible to use a RAM etc. as the key signal delay circuit 10 and the key signal delay circuit 10A and to consecutively write in the RAM and read out in accordance with a read clock so as to provide delayed key signals delayed by one clock each.

According to the key signal processing apparatus for video signal processing of the first embodiment of the present invention, it is possible to adjust key signals at the sub-pixel size smaller than the pixel size.

Further, according to the first embodiment of the present invention, even if there is a considerable time difference between two key signals, the pulse widths of the key input signals can be made continuous and adjustment is possible without problem in accordance with the set mode.

Further, according to the first embodiment of the present invention, it is possible to synthesize a signal in a desired mode from two signals adjusted at the sub-pixel level in this way.

Second Embodiment

An explanation will now be made of a key signal processing apparatus for video signal processing of a second embodiment of the present invention.

Figure 9:
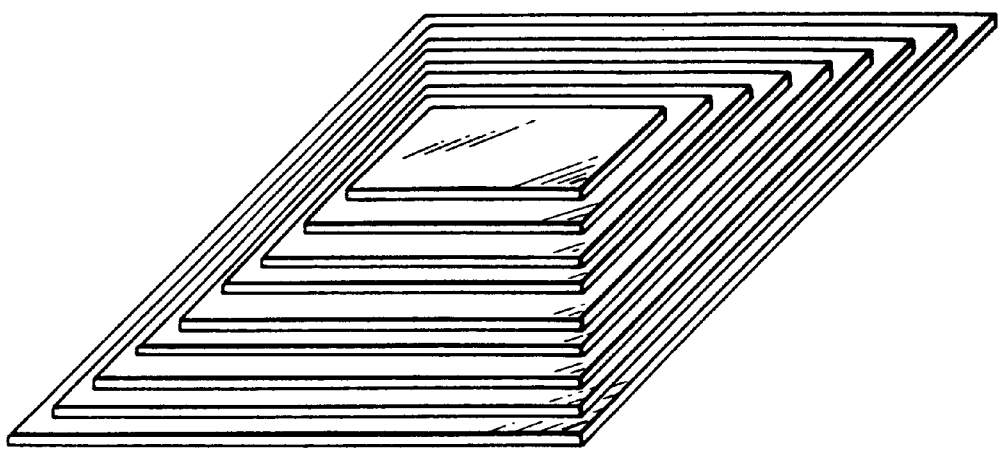
FIG. 9 is a graph illustrating the softened borderline according to the present invention.

FIG. 9 is a graph illustrating the softened borderline. For this type of image processing in which an original video signal is expanded in a three-dimensional pyramid form, it is necessary to create a key signal having a three-dimensional magnitude.

Figure 10:
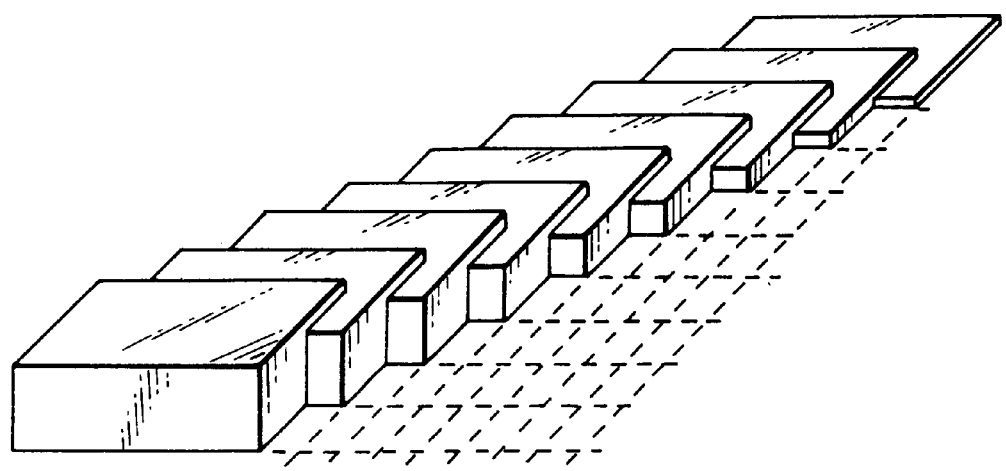
FIG. 10 is a graph illustrating the softened drop border according to the present invention.

FIG. 10 is a graph illustrating the softened drop-border. This type of image processing which three-dimensionally consecutively changes the magnitude of the original video signal requires the creation of a key signal having a three-dimensional magnitude.

As shown in FIG. 9 and FIG. 10, to perform the softened borderline or softened drop-border, the above-mentioned key signal processing of the first embodiment which performs one-dimensional signal adjustment is not sufficient. It is necessary to expand the processing of the key signal to two-dimensional signal adjustment and, further, three-dimensional signal adjustment.

Figure 11:
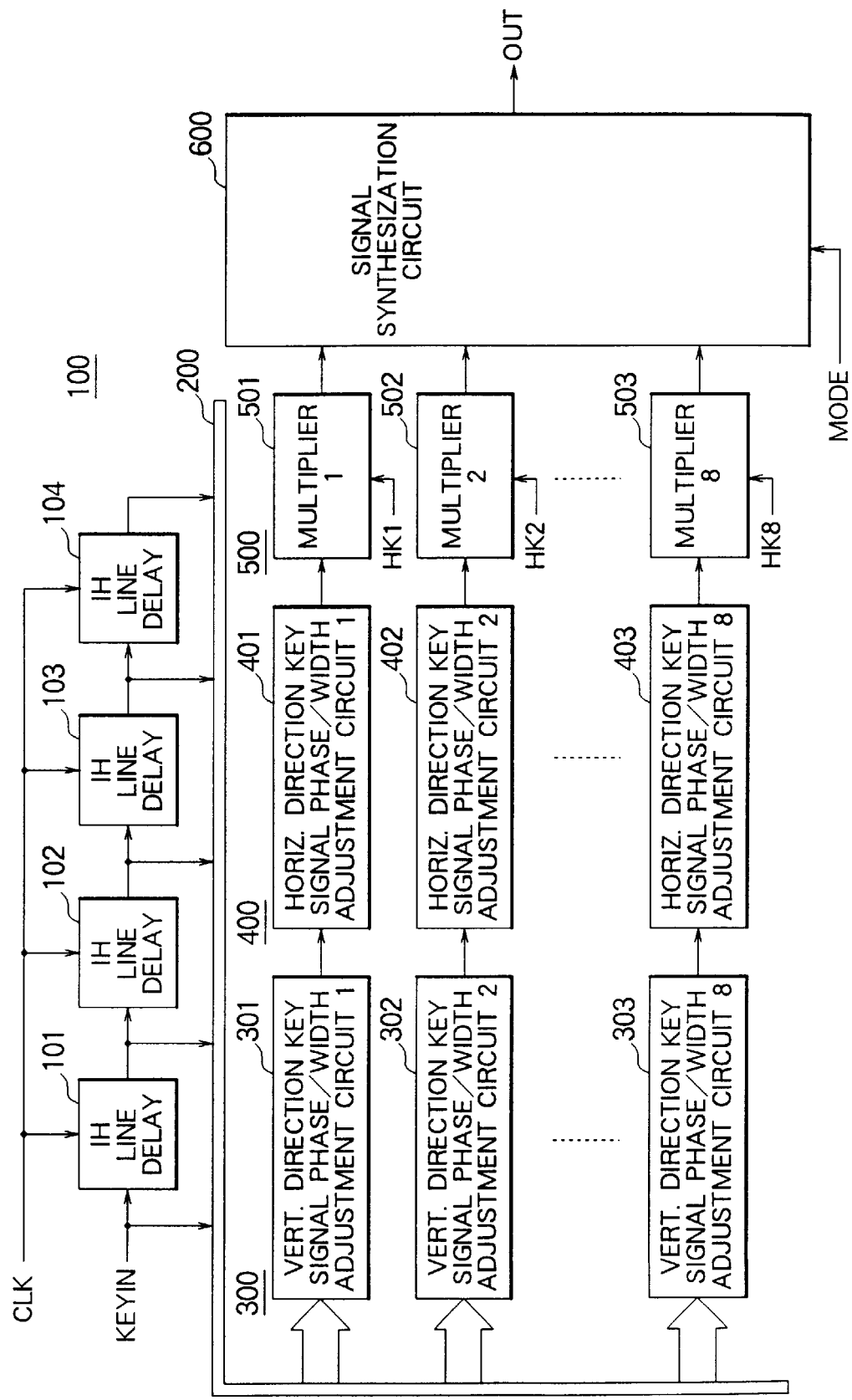
FIG. 11 is a view of the configuration of a key signal processing apparatus for video signal processing which processes key signals enabling softened borderline shown in FIG. 9 or softened drop-border shown in FIG. 10 as a second embodiment of the key signal processing apparatus for video signal processing of the present invention.

FIG. 11 is a view of the configuration of a key signal processing apparatus for video signal processing of a second embodiment of the present invention which produces key signals enabling softened borderline shown in FIG. 9 or softened drop-border shown in FIG. 10.

The key signal processing apparatus for video signal processing illustrated in FIG. 11 is provided with a key signal delay circuit 100, a signal transmission bus 200, a longitudinal (vertical) direction signal adjustment unit 300, a lateral (horizontal) direction signal adjustment unit 400, a multiplication unit 500, and a signal synthesization circuit 600.

The operation of the key signal processing apparatus for video signal processing will be summarized next.

The key input signal KEYIN used for phase adjustment and signal synthesization is delayed by the key signal delay circuit 100.

The key input signal KEYIN and delayed key signals are supplied through a signal transmission bus 200 to the longitudinal (vertical) direction signal adjustment unit 300, are adjusted in the vertical direction, and are combined to enlarge the pulse width.

The output of the longitudinal (vertical) direction signal adjustment unit 300 is supplied to the lateral (horizontal) direction signal adjustment unit 400. At the lateral (horizontal) direction signal adjustment unit 400, it is adjusted and then combined to enlarge the pulse width.

The thus vertical direction and horizontal direction adjusted key signal is multiplied with the coefficients HK1 to HK8 at the multiplication unit 500 and adjusted in its magnitude in the height direction.

In the signal synthesization circuit 600, phase adjusted key signals are combined based on the mode signal MODE.

The key signal processing apparatus for video signal processing of the second embodiment will be explained in further detail below.

The key signal delay circuit 100 is provided with 1H line delay circuits 101 to 104 which delay the key signal by 1H (time corresponding to one horizontal synchronization period of the video signal), the longitudinal (vertical) direction signal adjustment unit 300 is provided with eight vertical direction signal adjustment circuits 301 to 303, the horizontal direction signal adjustment unit 400 is provided with eight horizontal direction signal adjustment circuits 401 to 403, and the multiplication unit 500 is provided with eight multiplication circuits 501 to 503.

The number of the 1H line delay circuits 101 to 104 is determined in accordance with the amount of adjustment of the video signal for key signal processing and the number of the video signals.

The longitudinal (vertical) direction signal adjustment unit 300, the lateral (horizontal) direction signal adjustment unit 400, and the multiplication unit 500 are each provided with eight circuits in this second embodiment. The eight circuits, for example, correspond to the height in the case of softened borderline shown in FIG. 9. They correspond to the consecutive number in the case of softened drop-border shown in FIG. 10.

The key signal delay circuit 100 is comprised of a cascade connection of 1H line delay circuits 101 to 104 which successively delay a key input signal KEYIN by 1H line units based on the clock CLK. As these 1H line delay circuits 101 to 104, use may be made of frame memories used for video signal processing, for example. By writing and reading out the key input signal KEYIN to and from the frame memories, key signals delayed 1H are obtained.

In the key signal delay circuit 10A in the key signal processing apparatus for video signal processing of the first embodiment explained above and the key signal delay circuit 10 shown in FIG. 2, pixel units of delay corresponding to the clock were given to the key input signals, but in this embodiment, to produce a key signal able to be used for broader image processing, the key input signal KEYIN is also processed to give a delay of 1H line. Of course, the reference for the 1H line delay is the clock CLK.

The delayed key signal of the output of the center 1H line delay circuit 102 becomes the reference signal for timing of the signal processing in the longitudinal (vertical) direction signal adjustment unit 300, lateral (horizontal) direction signal adjustment unit 400, etc. That is, using the delayed key signal of the output of the center 1H line delay circuit 102 as a center, the longitudinal (vertical) direction signal adjustment unit 300, lateral (horizontal) direction signal adjustment unit 400, etc. carry out signal processing in front and in back of the same.

The signal transmission bus 200 supplies the key input signal KEYIN and the key signals delayed in the key signal delay circuit 10 to the longitudinal (vertical) direction signal adjustment unit 300.

The longitudinal (vertical) direction signal adjustment unit 300 receives as input the key input signal KEYIN and the delayed key signals delayed in the key signal delay circuit 100 and adjusts the magnitude of the input key signal in the vertical direction.

The longitudinal (vertical) direction signal adjustment unit 300 is comprised of the eight parallel vertical direction signal adjustment circuits 301 to 303 in this embodiment. These circuits 301 to 303 have the same configurations.

The eight vertical direction signal adjustment circuits 301 to 303 are comprised by circuits corresponding to the matrix circuit 20A, first signal interpolation circuit 30A and second signal interpolation circuit 30B, and signal synthesization unit 40A in the key signal processing apparatus for video signal processing explained with reference to FIG. 1. However, in the second embodiment, since the key signal is delayed in the key signal delay circuit 100, the clock unit key signal delay circuit 10A shown in FIG. 1 is not needed. The signal selection, signal interpolation, and signal synthesization processing in the second embodiment are basically the same as in the case of the key signal processing apparatus for video signal processing explained referring to FIG. 1. However, in the longitudinal (vertical) direction signal adjustment unit 300, processing is performed for the vertical direction.

The lateral (horizontal) direction signal adjustment unit 400 is also comprised of eight parallel horizontal direction signal adjustment circuits 401 to 403. These circuits 401 to 403 have the same configuration.

These eight horizontal direction signal adjustment circuits 401 to 403 are comprised of circuits corresponding to the matrix circuit 20A, first signal interpolation circuit 30A and second signal interpolation circuit 30B, and signal synthesization unit 40A in the key signal processing apparatus for video signal processing referred to with reference to FIG. 1. However, in the second embodiment, since the key signal is delayed in the key signal delay circuit 100, the key signal delay circuit 10A for giving one clock delays shown in FIG. 1 is not needed. The signal selection, the signal interpolation, and the signal synthesization processing in the second embodiment are the same as in the case of the key signal processing apparatus for video signal processing explained referring to FIG. 1. However, in the lateral (horizontal) direction signal adjustment unit 400, processing is performed for the horizontal direction.

In this embodiment, the multiplication unit 500 has eight multiplication circuits 501 to 503 and performs signal adjustment in the height direction on the results of signal adjustment in the vertical direction in the longitudinal (vertical) direction signal adjustment unit 300 and signal adjustment in the horizontal direction in the lateral (horizontal) direction signal adjustment unit 400. The signal adjustment means multiplication by coefficients HK1 to HK8. Accordingly, the multiplication circuits 501 to 503 multiply the coefficients HK1 to HK8 with the results of the horizontal direction signal adjustment circuits 401 to 403. The multiplication coefficients HK1 to HK8 are set by the operator in the same way as the selection control signal SELCNT, mode signal MODE, etc.

The signal synthesization circuit 600 combines the above-mentioned three-dimensionally adjusted key signals for signal synthesization.

As the method of signal synthesization, the mode 0, that is, the positive NAM computation, is the most general one, but it is possible to perform negative NAM computation or other signal synthesization shown in Table 1 in accordance with the objective of use of the key signal. This is designated by the operator by the mode signal MODE.

If use is made of such a key signal processed by the key signal processing apparatus for video signal processing of the second embodiment, then the video signal can be subjected to softened borderline shown in FIG. 9 or softened drop-border shown in FIG. 10.

The key signal processing apparatus for video signal processing of the second embodiment of the present invention is not limited to the configuration illustrated in FIG. 11. Various modifications are possible.

For example, the positions of the longitudinal (vertical) direction signal adjustment unit 300 and lateral (horizontal) direction signal processing unit 400 may be reversed.

Alternatively, the processing of the longitudinal (vertical) direction signal adjustment unit 300 and the processing of the lateral (horizontal) direction signal processing unit 400 may be performed independently and the present results combined.

According to the key signal processing apparatus for video signal processing of the second embodiment of the present invention, like with the first embodiment, it is possible to adjust key signals at the sub-pixel level smaller than the pixel size.

Further, according to the second embodiment of the present invention, like with the first embodiment, even if there is a considerable time difference between two key signals, the pulse widths of the key input signals can be made continuous and adjustment is possible without problem in accordance with the set mode.

Further, according to the second embodiment of the present invention, like with the first embodiment, it is possible to combine a signal in a desired mode from two signals adjusted at the sub-pixel level in this way.

In addition, according to the second embodiment, it is possible to produce a key signal suitable for softened borderline or softened drop border.

Also, the filter performance is improved when using the key signal processing apparatus for video signal processing of the present invention as a bandpass filter effective in both the vertical and horizontal directions of the key signal.

Third Embodiment

An explanation will now be made of a key signal processing apparatus for video signal processing of a third embodiment of the present invention which is able to multiple and efficiently produce key signals enabling softened borderline processing or softened drop border.

Figure 12:
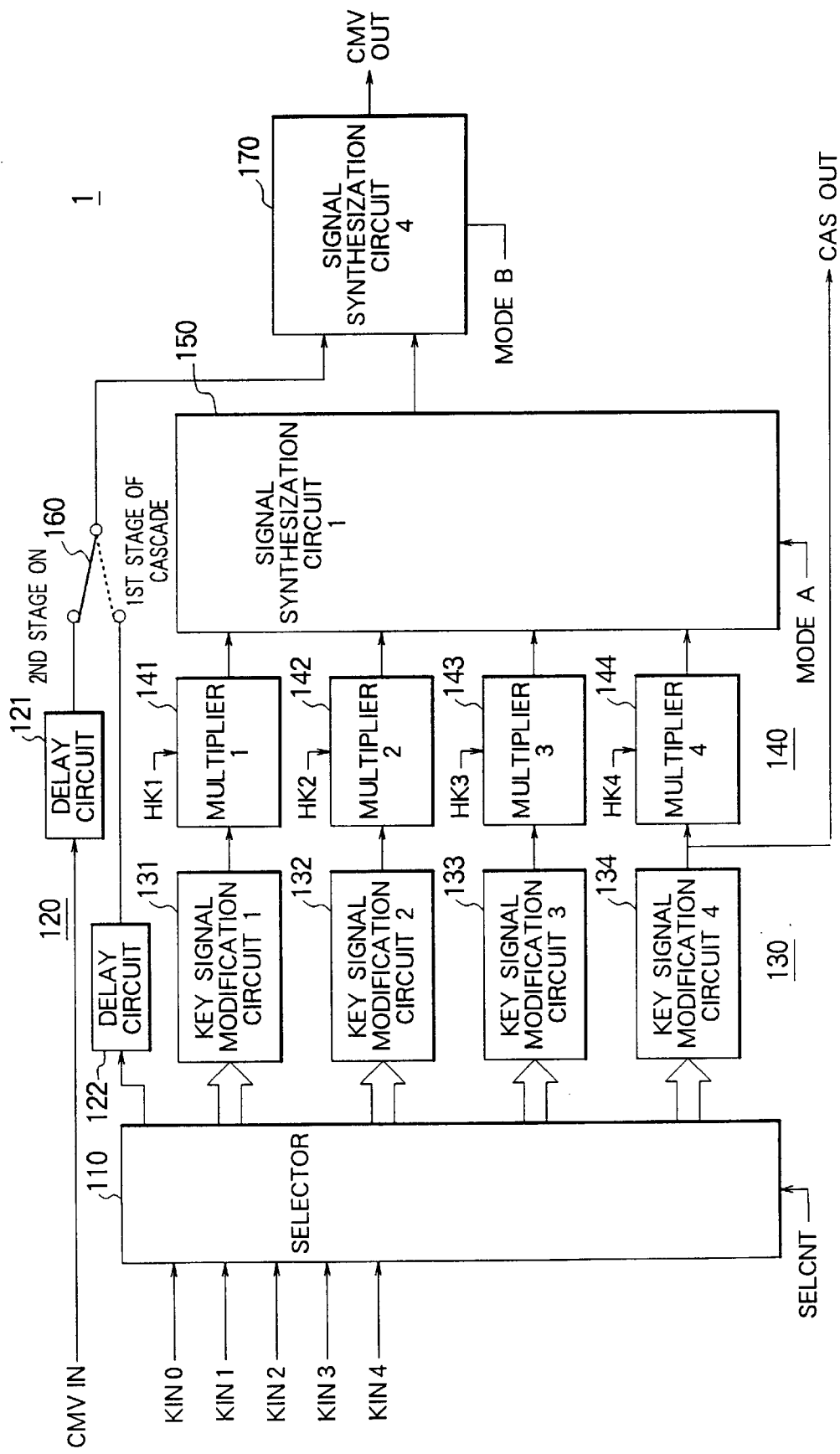
FIG. 12 is a view of the configuration of a key signal processing apparatus for video signal processing which processes multiple and efficiently key signals enabling softened borderline or softened drop-border as a third embodiment of the key signal processing apparatus for video signal processing of the present invention.

FIG. 12 is a view of the configuration of a key signal processing apparatus for video signal processing of the third embodiment of the present invention.

The key signal processing apparatus for video signal processing is comprised of a selector 110, a key signal modification unit 130 comprised of a plurality of key signal modification circuits 131 to 134, a multiplication unit 140 comprised of a plurality of multipliers 140 to 144, a first signal synthesization (combination or mixing) circuit 150, a second signal synthesization (combination or mixing) circuit 170, a timing adjustment circuit 120 comprised of a first delay circuit 121 and second delay circuit 122, and a switching circuit 160.

The key signal processing apparatus for video signal processing shown in FIG. 12 is realized using the circuits comprising the key signal processing apparatuses for video signal processing of the first and second embodiments.

The key signal processing apparatus for video signal processing shown in FIG. 12 performs signal processing on the five key signals KIN0 to KIN4. These key signals KIN0 to KIN4 are supplied to the selector 110 where a plurality of any pairs of signals selected based on the selection control signal SELCNT are selected in the same way as the matrix circuit 20A shown in FIG. 1 and the signal selection circuit 20 shown in FIG. 2.

A pair of key signals selected at the selector 110 is supplied to the key signal modification circuits 131 to 134.

Each of the key signal modification circuits 131 to 134 is provided with the signal delay circuit shown in FIG. 1 and FIG. 2 and performs the signal adjustment shown in FIG. 11 on the delayed key signals.

Each of the key signal modification circuits 131 to 134 is comprised of a combination of a longitudinal (vertical) direction signal adjustment unit 300 and a lateral (horizontal) direction signal adjustment unit 400 of the key signal processing apparatus for video signal processing shown in FIG. 11. That is, the circuit of each of the key signal modification circuits 131 to 134 performs signal adjustment in the vertical direction and performs signal adjustment in the horizontal direction on the results. Alternatively, the circuit of each of the key signal modification circuits 131 to 134 performs signal adjustment in the horizontal direction and performs signal adjustment in the vertical direction on the results.

The multipliers 141 to 144, in the same way as the multiplication unit 500 shown in FIG. 11, multiply the key signals adjusted at the key signal modification circuits 131 to 134 with coefficients to adjust the signals in the height direction.

The results are combined in the first signal synthesization circuit 150 based on the first mode signal MODE A in the same way as the first signal synthesization circuit 600, that is, in this example, a positive NAM computation is carried out.

The key signal processing apparatus for video signal processing shown in FIG. 12 combines a signal from the combination input signal CMVIN input to the first delay circuit 121 and the output of the first signal synthesization circuit 150 or one of the key signals KIN0 to KIN4 selected by the selector 110 and the output of the first signal synthesization circuit based on the second mode signal MODE B in the second signal synthesization circuit 170. The signal synthesization in the second signal synthesization circuit 170 is for example positive NAM computation in this example.

At the time of this signal synthesization, use is made of the switching circuit 160 for selecting the combination input signal CMVIN input to the first delay circuit 12 and one of the key signals KIN0 to KIN4 selected by the selector 110. The switching circuit 160, in the case of the first stage of the cascade circuit configuration, supplies one of the key signals KIN0 to KIN4 selected by the selector 110 to the second signal synthesization circuit 170. That is, in the case of the first stage of the cascade circuit configuration, the key signal from the selector 110 and the result from the first signal synthesization circuit 150 are combined for signal synthesization at the second signal synthesization circuit 170. In the case of the second stage of the cascade circuit configuration and later, the combination input signal CMVIN and the result from the first signal synthesization circuit 150 are combined at the second signal synthesization circuit 170.

The first delay circuit 121 is a circuit for matching the timing of the combination input signal CMVIN and the result output from the selector 110 and processed by the key signal modification unit 130, multiplication unit 140 and first signal synthesization circuit 150. Similarly, the second delay circuit 122 is a circuit for matching the timing of one of the key signals KIN0 to KIN4 selected by the selector 110 and the result output by the selector 110 and processed by the key signal modification unit 130, multiplication unit 140, and first signal synthesization circuit 150.

Figure 13:
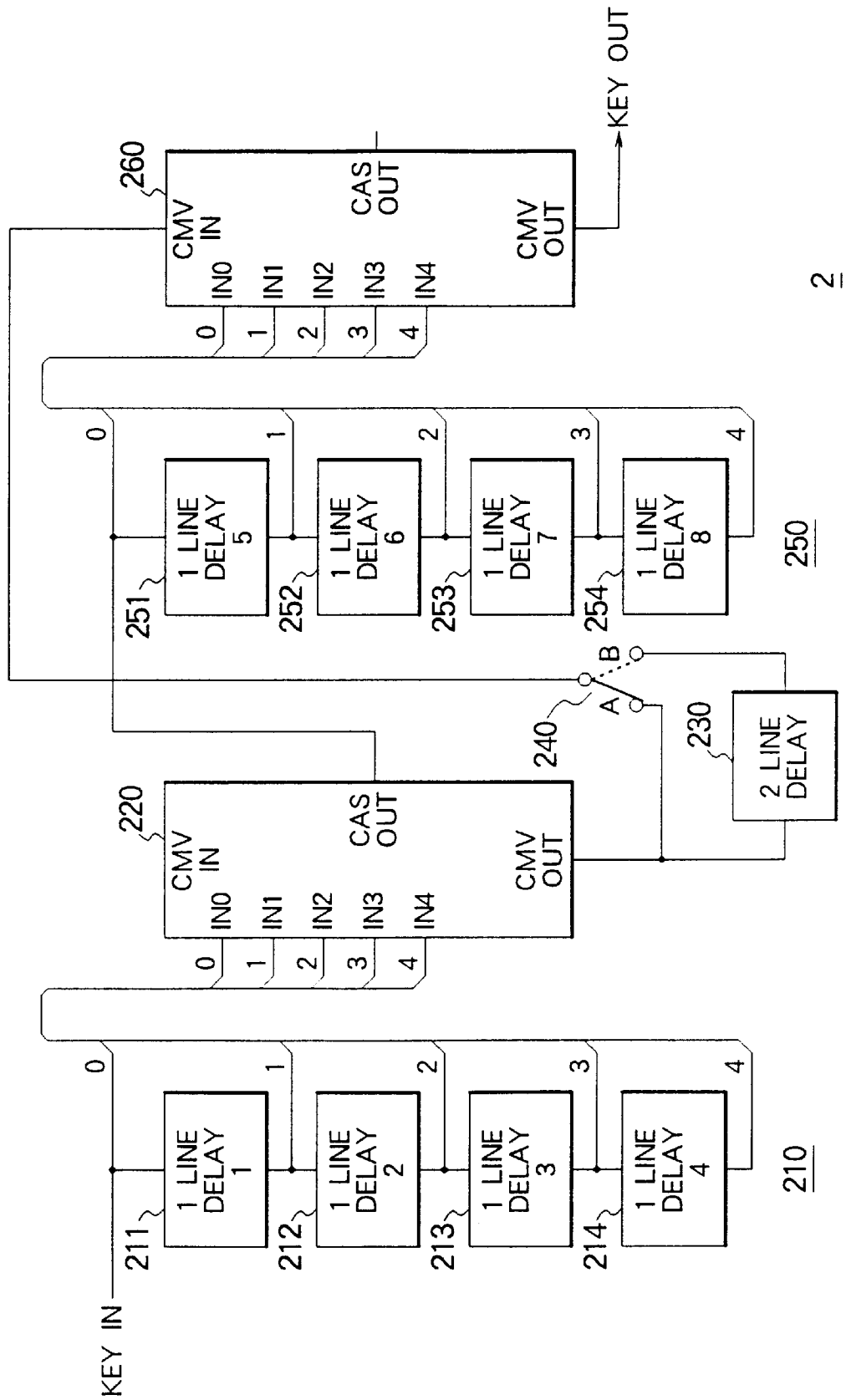
FIG. 13 is a view of the configuration of an expansion of the key signal processing apparatus for video signal processing shown in FIG. 2 as a fourth embodiment of the key signal processing apparatus for video signal processing of the present invention.

The result of the signal synthesization at the second signal synthesization circuit 170, that is, the combination output signal CMVOUT, is either used as the processed key signal as it is or else is supplied to the next key signal processing apparatus for video signal processing for the synthesization shown in FIG. 13.

Further, the output of the key signal modification circuit 134 is output for the next processing as the cascade output CASOUT.

The detailed operation of the key signal processing apparatus for video signal processing of the third embodiment will be explained later along with that of the key signal processing apparatus for video signal processing of the fourth embodiment.

Fourth Embodiment

A key signal processing apparatus for video signal processing of a fourth embodiment of the present invention will be explained next referring to FIG. 13.

FIG. 13 is a view of the configuration of a key signal processing apparatus for video signal processing comprising an expansion of the key signal processing apparatus for video signal processing shown in FIG. 12 as the fourth embodiment of the present invention.

The key signal processing apparatus for video signal processing shown in FIG. 13 has the key signal processing apparatus for video signal processing shown in FIG. 12 comprised as a single integrated circuit (IC) and may be comprised by connection of the required number of the same.

The key signal processing apparatus for video signal processing shown in FIG. 13 is comprised of a first signal delay unit 210 comprised of the 1-line delay circuits 211 to 214 which give delays of exactly the time corresponding to the time for scanning one line of the video signal, a key signal processing IC 220 for video signal processing which comprises the key signal processing apparatus for video signal processing shown in FIG. 12 as an IC, a 2-line delay circuit 230 which gives a delay of exactly a time corresponding to the time for scanning two lines of the video signal, a switching circuit 240, a signal delay unit 250 comprised of the 1-line delay circuits 251 to 254 which give delays of exactly a time corresponding to the time for scanning one line of the video signal, and a second key signal processing IC 260 for video signal processing the same as the key signal processing IC 220 for video signal processing.

The basic operation of the first key signal processing IC 220 for video signal processing and the second key signal processing IC 260 for video signal processing was explained with reference to FIG. 12. The first key signal processing IC 220 for video signal processing does not receive as input the combination input signal CMVIN of the previous stage, so the switching circuit 160 shown in FIG. 12 supplies the key signal output from the selector 110 to the second signal synthesization circuit 170, but the second key signal processing IC 260 for video signal processing is supplied with the combination output signal CMVOUT of the first key signal processing IC 220 for video signal processing as the combination input signal CMVIN of the second key signal processing IC 260 for video signal processing, so the combination input signal CMVIN is used for signal synthesization in the second signal synthesization circuit 170.

The basic functions of the first signal delay unit 210 and the second signal delay unit 250 are similar to those of the 1H line delay circuit 100 shown in FIG. 11.

The switching circuit 240 performs switching to either directly select the combination output signal CMVOUT of the first key signal processing IC 220 for video signal processing and output it as the combination input signal CHVIN of the second key signal processing IC 260 for video signal processing or else to supply the result of timing adjustment at the 2-line delay circuit 230 as the composite input signal CMVIN of the first key signal processing IC 220 for video signal processing.

As illustrated in FIG. 13, the first signal delay circuit 210 and the first key signal processing IC 220 for video signal processing are used as a set which is suitably connected in cascade through the switching circuit 240 and 2-line delay circuit 230 to the next set, that is, the second signal delay unit 250 and the second key signal processing IC 260 for video signal processing to enable exactly the necessary synthesization processing for key signals.

The 2-line delay circuit 230, as explained later, is a circuit for giving smooth borderlines.

Explanation of Operation of Third Embodiment and Fourth Embodiment

Below, an explanation will be made of the specific operation of the key signal processing apparatus for video signal processing of the third embodiment shown in FIG. 12 and the key signal processing apparatus for video signal processing of the fourth embodiment shown in FIG. 13.

Figure 14:
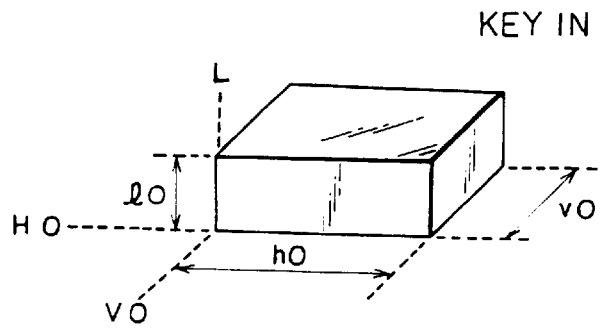
FIG. 14 is a view illustrating three-dimensionally a key signal which serves as the basic unit for processing in the key signal processing apparatus for video signal processing of the third embodiment and fourth embodiment of the present invention.
Figure 15A:
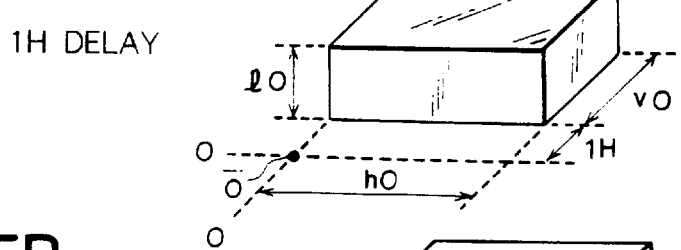
FIGS. 15A to 15D are graphs showing the state of successively delaying by 1H line each the key input signal shown in FIG. 14.
Figure 15B:
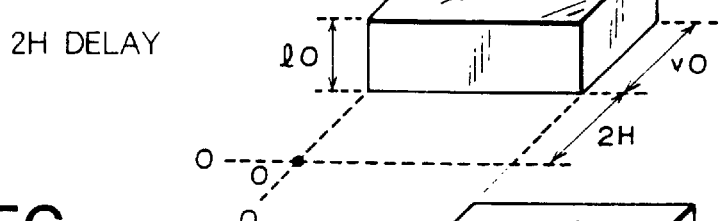
Figure 15C:
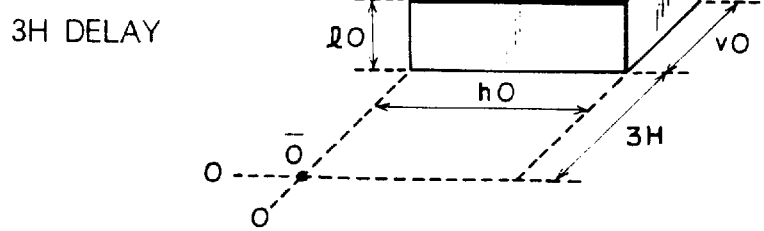
Figure 15D:
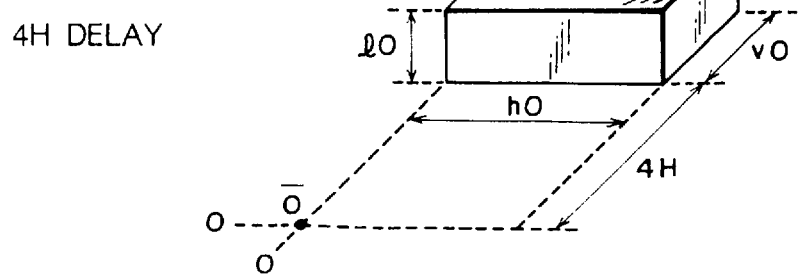
Figure 16A:
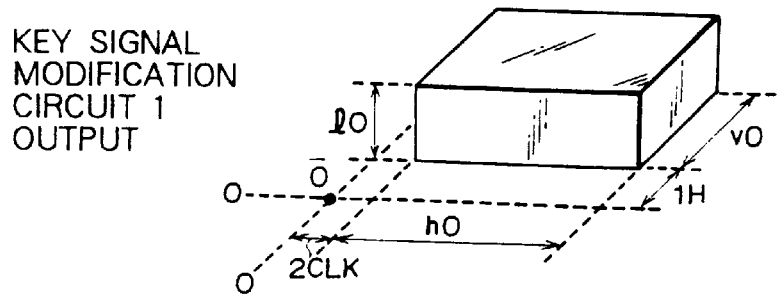
FIGS. 16A to 16D are graphs showing the results of application of shadow in the key signal modification circuit shown in FIG. 12 to the key signal shown in FIG. 15.
Figure 16B:
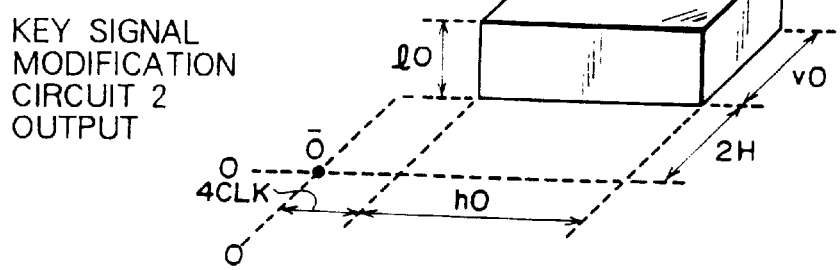
Figure 16C:
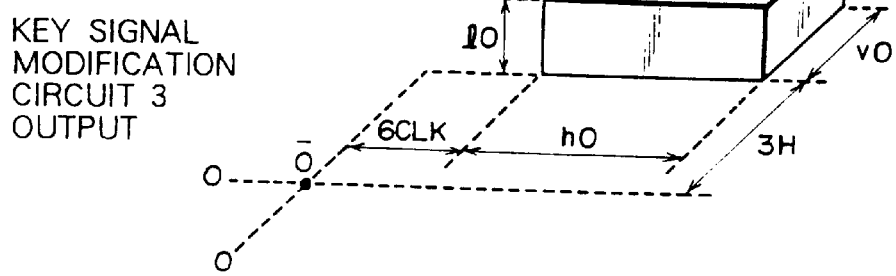
Figure 16D:
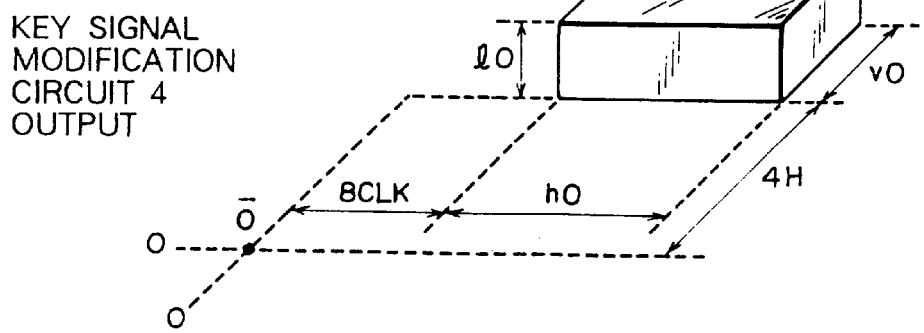
Figure 17A:
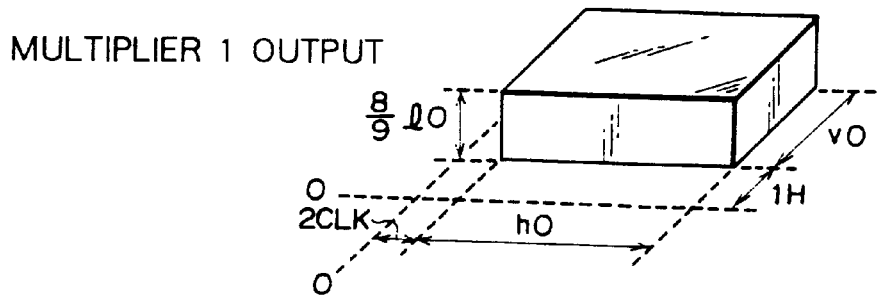
FIGS. 17A to 17D are graphs showing the results of multiplication of the results shown in FIGS. 16A to 16D and the coefficients 8/9, 7/9, 6/9, and 5/9 in the multiplier shown in FIG. 12 of the first key signal processing IC 220 for video signal processing of FIG. 13.
Figure 17B:
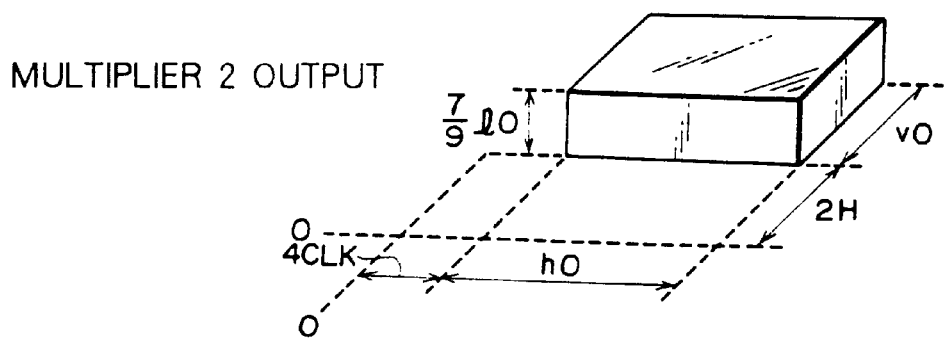
Figure 17C:
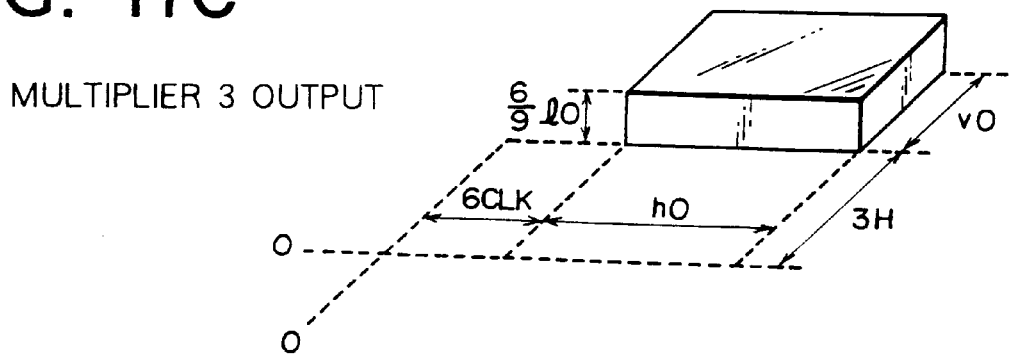
Figure 17D:
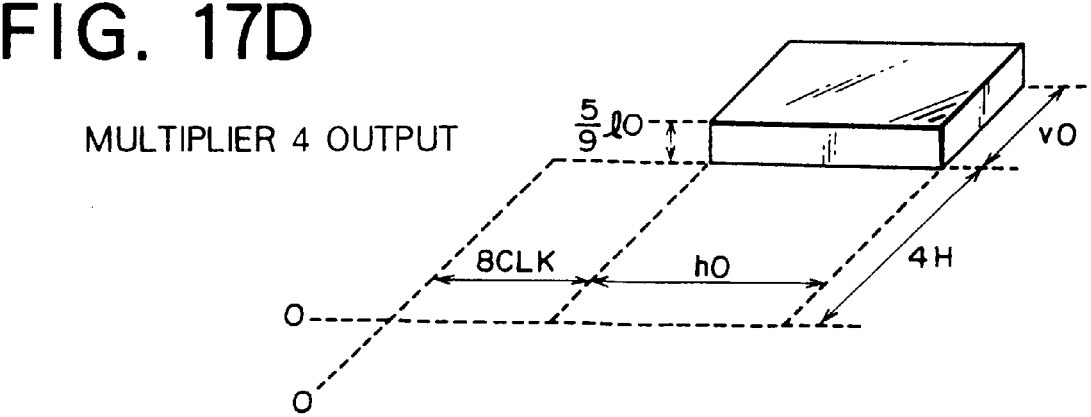

FIG. 14 is a three-dimensional view of the key input signal KEYIN which serves as the basic unit of the processing. This key input signal KEYIN is expressed as a rectangular solid of v0 in the vertical direction, h0 in the horizontal direction, and a uniform 1(letter 1)0 height (level).

When the key input signal KEYIN shown in FIG. 14 is supplied to the first signal delay unit 210 of the key signal processing apparatus for video signal processing shown in FIG. 13, it is successively delayed by 1H with respect to the origin (reference time) 0 as shown in FIGS. 15A to 15D.

These delayed key signals KIN0 to KIN4 are supplied to the first key signal processing IC 220 for video signal processing of FIG. 13.

The first key signal processing IC 220 for video signal processing is equivalent to the first key signal processing apparatus for video signal processing of FIG. 12, so the key signals KIN0 to KIN4 from the first signal delay unit 210 are supplied to the selector 110 of FIG. 12 and adjusted in the vertical direction and horizontal direction in the key signal modification unit 130.

Here, an explanation of giving a shadow to the key signals will be explained as one example. FIGS. 16A to 16D are graphs showing the results of the key signal modification circuits 131 to 134. The key signal modification circuits 131 to 134 each shift 1H in the vertical direction and two clocks in the horizontal direction.

The multipliers 141 to 144 shown in FIG. 12, in the first key signal processing IC 220 for video signal processing of FIG. 13, multiply the results shown in FIG. 16 with the coefficients 8/9, 7/9, 6/9, and 5/9, respectively. That is, they adjust the heights of the key signals shown in FIG. 16 based on the above coefficients. The results are illustrated in FIGS. 17A to 17D.

Figure 18:
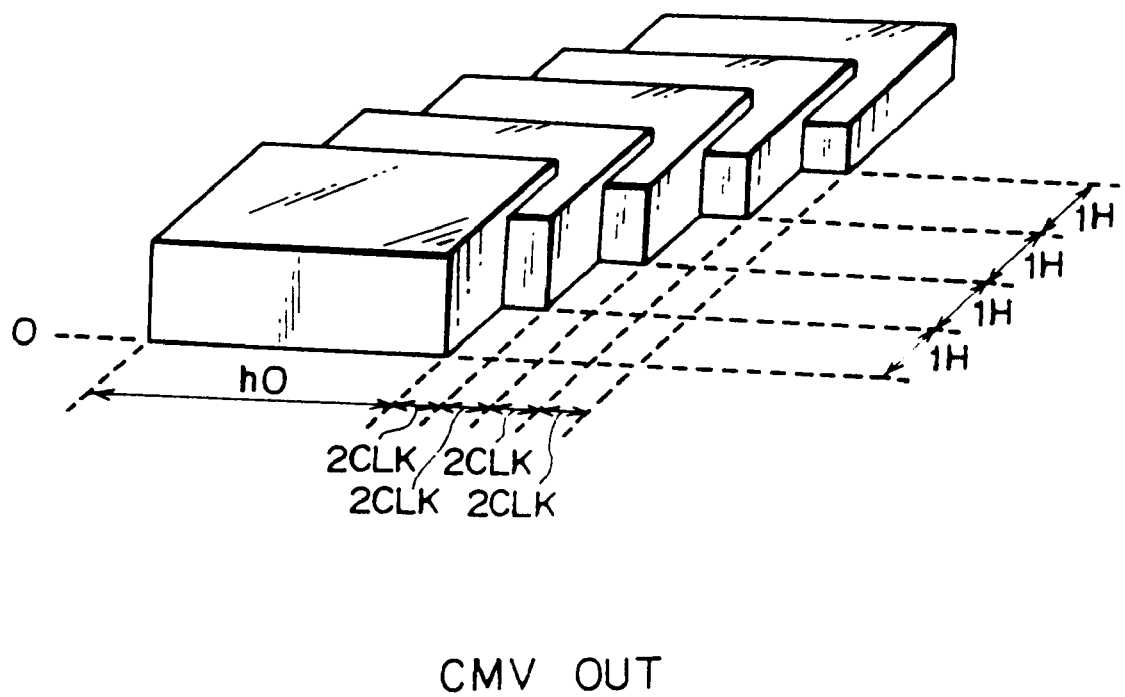
FIG. 18 is a graph showing the result of synthesization of a signal from the results shown in FIGS. 17A to 17D in the second signal synthesization circuit of FIG. 12.
Figure 19A:
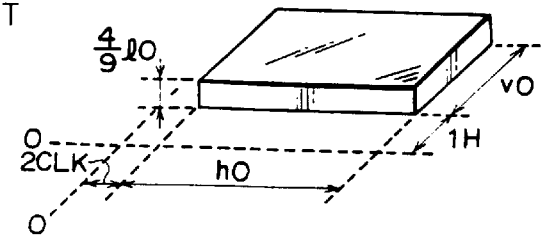
FIGS. 19A to 19D are graphs showing the results of processing of the results shown in FIG. 18 by the second key signal processing IC for video signal processing of FIG. 13.
Figure 19B:
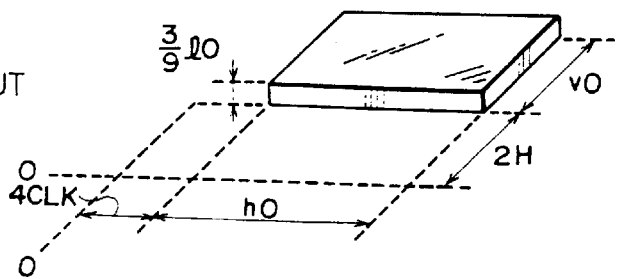
Figure 19C:
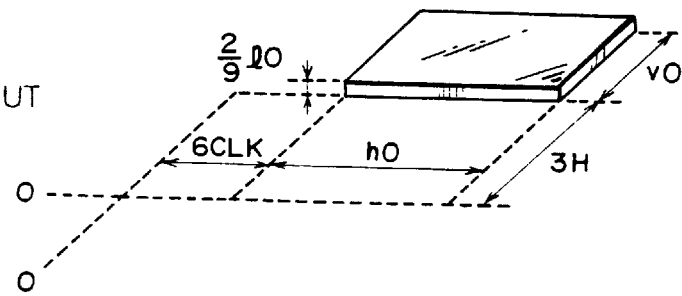
Figure 19D:
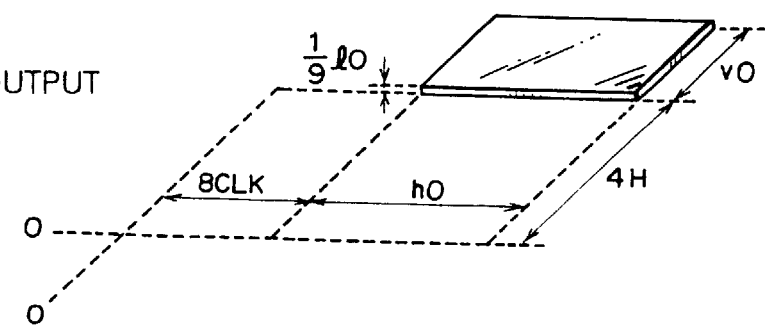

When the key signals illustrated in FIGS. 17A to 17D are combined in the first signal synthesization circuit 150 and the second signal synthesization circuit 170 of FIG. 12, the key signal shown in FIG. 18 is obtained. In this case, the switching circuit 160 in FIG. 12 is set to the first stage of the cascade and the key signal KIN0 selected from the selector 110 is combined with the key signal from the first signal synthesization circuit 150 in the second signal synthesization circuit 170 through the second delay circuit 122.

Above, an explanation was mainly made of an example of the operation of the key signal processing apparatus for video signal processing shown in FIG. 12, that is, the first key signal processing IC 220 for video signal processing shown in FIG. 13.

The cascade output CASOUT is output from the key signal modification circuit 134 shown in FIG. 2 or the first key signal processing IC 220 for video signal processing. The cascade output CASOUT is the key signal shown in FIG. 16D.

This cascade output CASOUT is led to the second signal delay unit 250 through the next second signal delay circuit 250 as shown in FIG. 13. By this, it is possible to perform the same type of key signal processing in the second signal delay unit 250. The results of the processing are shown in FIGS. 19A to 19D.

In the second key signal processing IC 260 for video signal processing, as shown in FIG. 12, the switch of the second and later stages of the cascade of the switching circuit 160 is selected and the combination output signal CMVOUT of the first key signal processing IC 220 for video signal processing is combined in the second signal synthesization circuit 170. The result is shown in FIG. 20.

Figure 20:
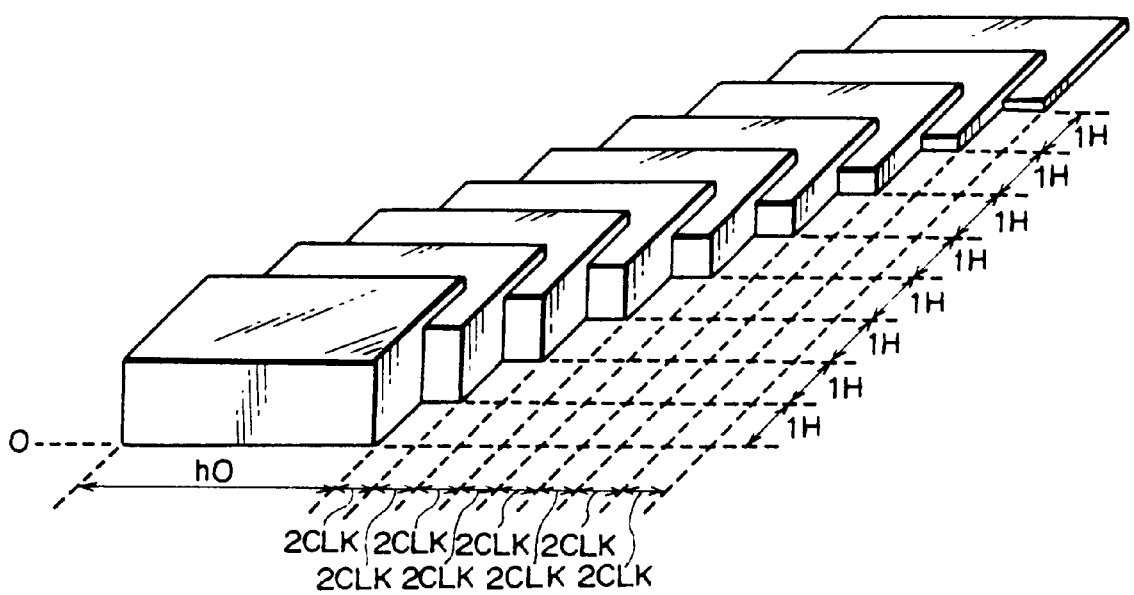
FIG. 20 is a graph showing the result of synthesization of a signal from the results shown in FIGS. 19A to 19D in the second key signal processing for video signal processing of FIG. 13.
Figure 21A:
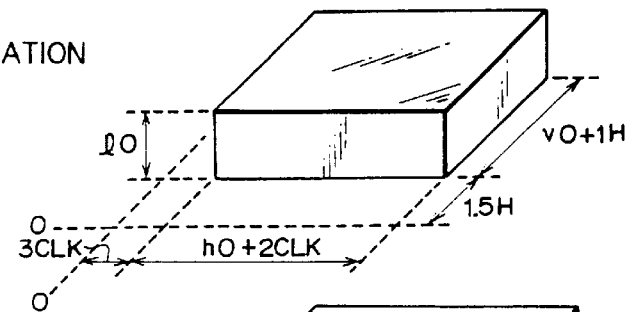
Figure 21B:
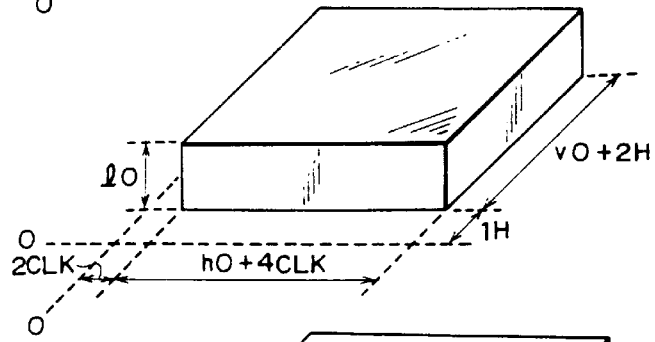
Figure 21C:
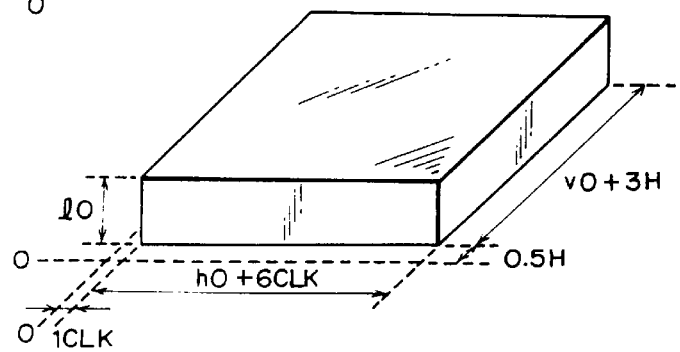
Figure 21D:
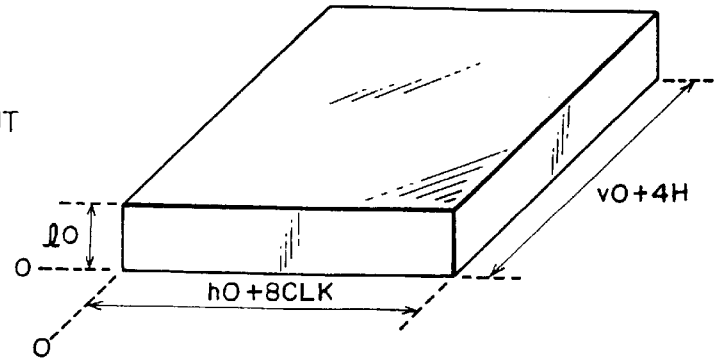
Figure 22A:
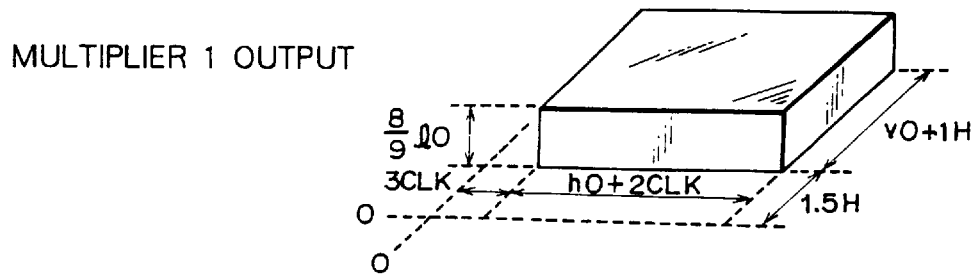
Figure 22B:
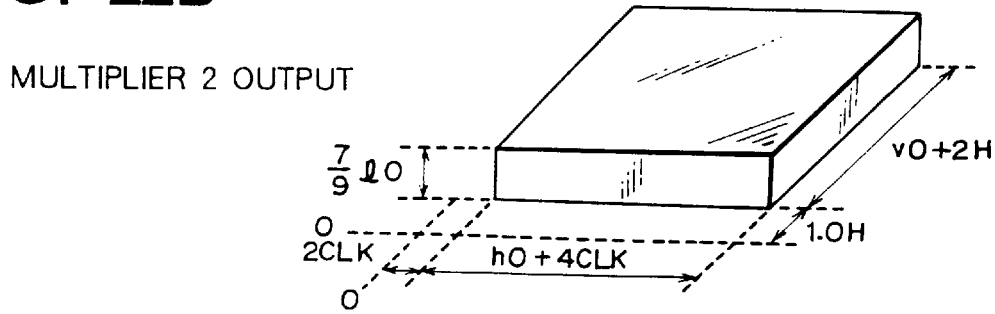
Figure 22C:
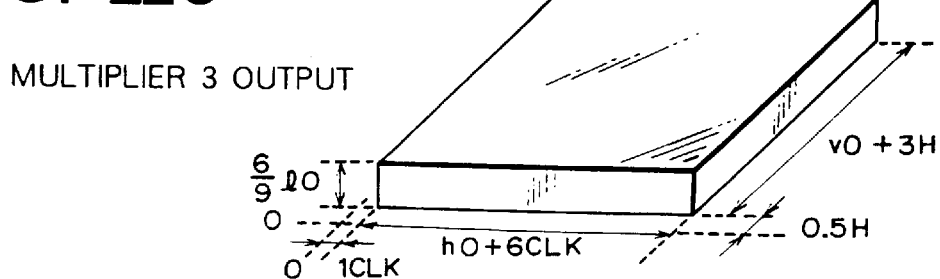
Figure 22D:
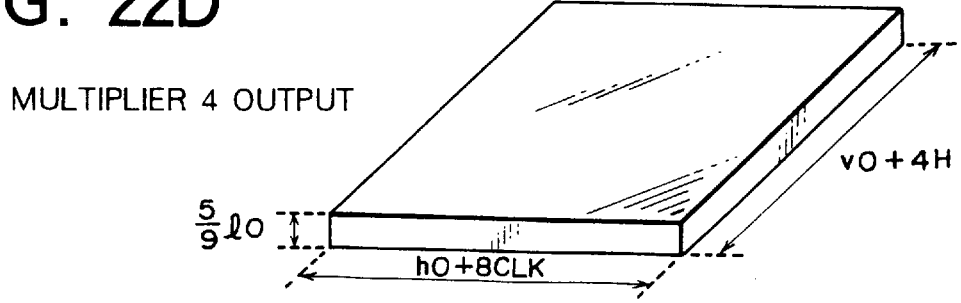

By the above processing, as shown in FIG. 20, it is possible to produce a key signal giving a three-dimensional shadow.

Next, an explanation will be given of the function of the 2-line delay circuit 230 provided between the first key signal processing IC 220 for video signal processing and the second key signal processing IC 260 for video signal processing. Explaining the conclusion first, the 2-line delay circuit 230 is for giving smooth borderlines.

Here, it is assumed that the result from the first key signal processing IC 220 for video signal processing, specifically, the result of the key signal modification unit 130 shown in FIG. 12, is as illustrated in FIGS. 21A to 22D. The key signals illustrated in FIGS. 21A to 22D increase the pulse width of the key input signal KEYIN illustrated in FIG. 14 by 0.5H in the vertical direction and one clock in the horizontal direction based on the signal delayed by 2 lines+4 clocks. The key signal shown in FIG. 21D is output from the key signal modification circuit 134 as the cascade output CASOUT.

The key signals output from the multipliers 141 to 144 of FIG. 12 are illustrated in FIGS. 22A to 22D.

Figure 23:
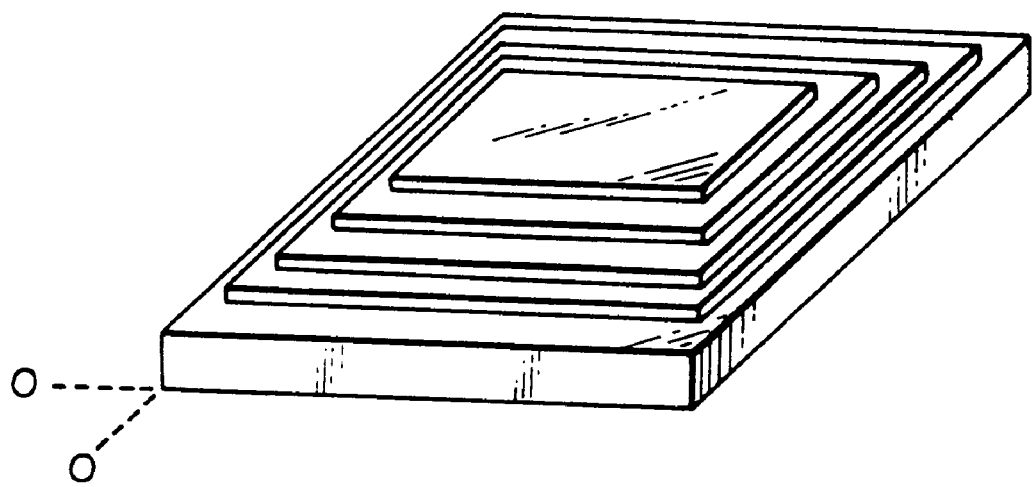
FIG. 23 is a graph showing the result of synthesization of a signal from the results shown in FIGS. 22A to 22D in the first signal synthesization circuit of FIG. 12.
Figure 24A:
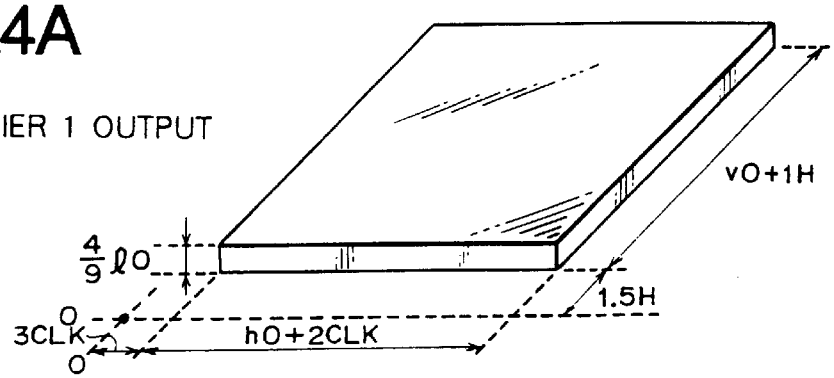
FIGS. 24A to 24D are graphs showing the results of computation of the results shown in FIGS. 23A to 23D in the multiplication unit in the second key signal processing IC for video signal processing operation of FIG. 13.
Figure 24B:
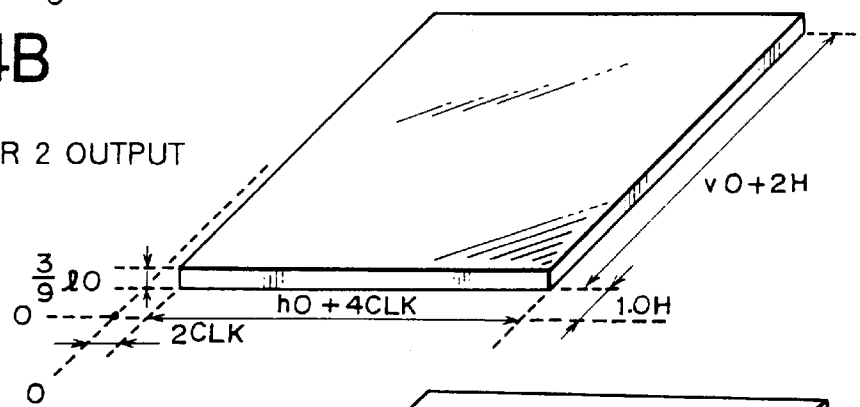
Figure 24C:
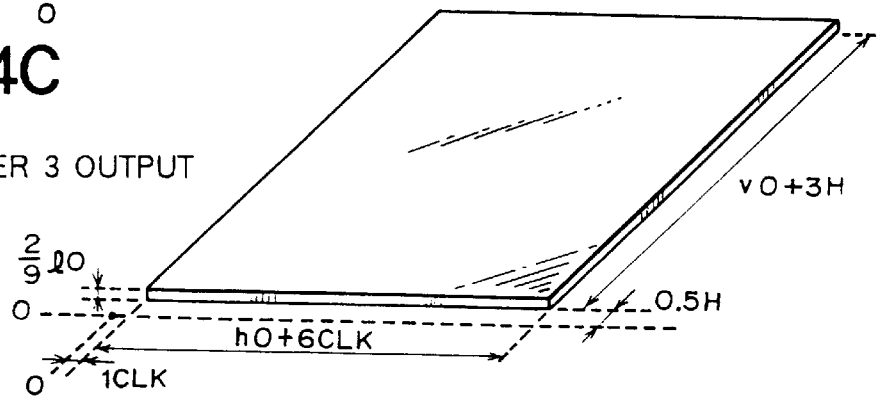
Figure 24D:
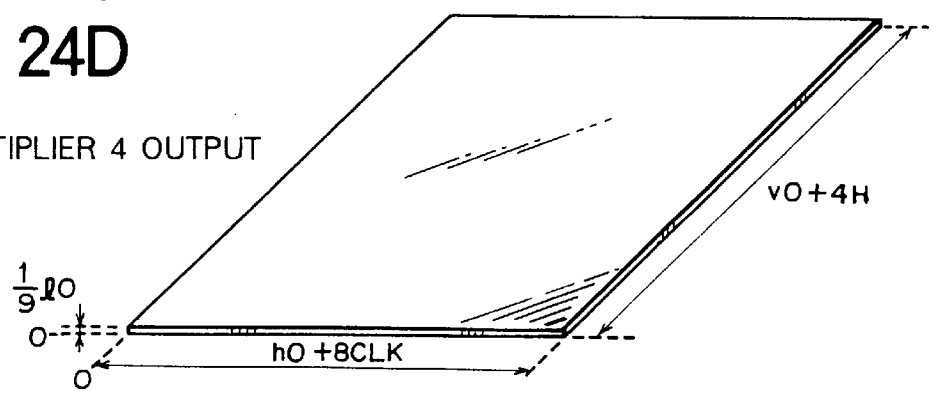

The results of synthesization of the first signal synthesization circuit 150 are shown in FIG. 23.

The first switching circuit 160 of FIG. 12 is set to the first stage of the cascade and the key signal KIN1 delayed by 2 lines is selected in the selector 110 as the key signal to be supplied to the second delay circuit 122. In the second delay circuit 122, a delay of 4 clocks is given.

The results of the multiplication unit equivalent to the multiplication unit 140 illustrated in FIG. 12, in the second key signal processing IC 260 for video signal processing of FIG. 13, are illustrated in FIGS. 24A to 24D.

Figure 25:
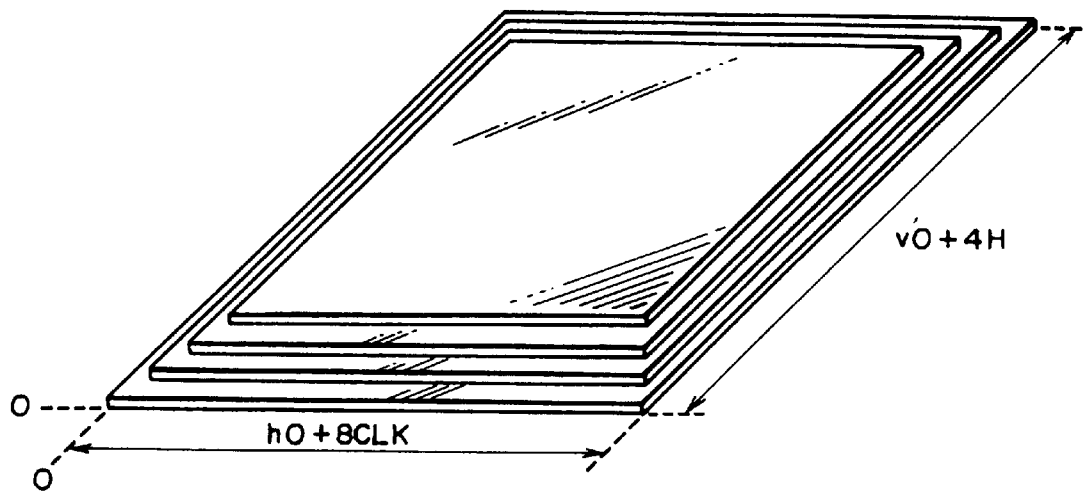
FIG. 25 is a graph showing the result of synthesization of a signal from the results shown in FIGS. 24A to 24D in the first signal synthesization circuit in the second key signal processing IC for video signal processing.

The results of synthesization of a signal using the results shown in FIGS. 24A to 24D in the first signal synthesization circuit 150 of the second key signal processing IC 260 for video signal processing are shown in FIG. 25. The combination output signal CMVOUT output by the first key signal processing IC 220 for video signal processing is the key signal illustrated in FIG. 23. By making the switching circuit 240 shown in FIG. 13 select the 2-line delay circuit 230, a delay of 2 lines is given. The object is to superpose the result of the first key signal processing IC 220 for video signal processing on the center of the pyramid shaped key signal as shown in FIG. 26.

Figure 26:
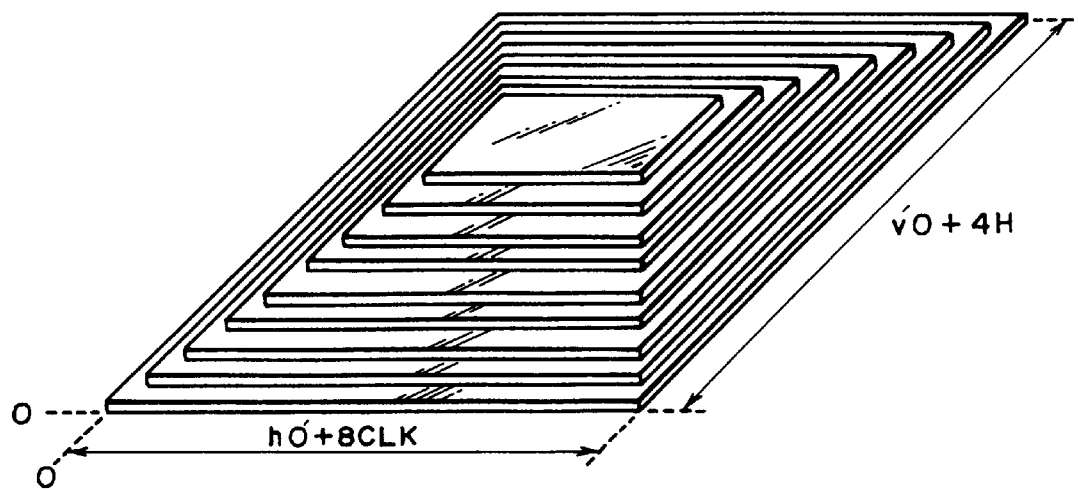
FIG. 26 is a graph explaining the facility of a 2-line delay circuit of FIG. 13 for giving smooth borderlines from the results shown in FIG. 25.

As a result, as shown in FIG. 26, the result of the first key signal processing IC 220 for video signal processing and the result of the first key signal processing IC 220 for video signal processing can be superposed as desired and as a result a key signal for giving smooth borderlines can be obtained.

As explained above, by connecting in cascade the first video signal processing key signal processing IC 220 and the second video signal processing key signal processing IC 260, the effects exemplified below are exhibited:

(1) The borderline of the key signal can be made broader.

(2) When making a shadow of the key signal, the shadow can be lengthened.

(3) When used as a bandpass filter exhibiting effects in the vertical and horizontal directions of the key signal, the performance of the filter is improved.

Further, in the embodiment(s), the key signal processing apparatus for video signal processing shown in FIG. 12 can be realized as an IC. By connecting in cascade exactly the number of ICs needed, it is possible to easily perform the desired combination key signal processing.

The key signal processing of FIG. 12 and FIG. 13 explained above are illustrations. The key signal processing apparatus for video signal processing of the present invention is not limited to the above applications and can be applied for various types of key signal processing.

Fifth Embodiment

Figure 27:
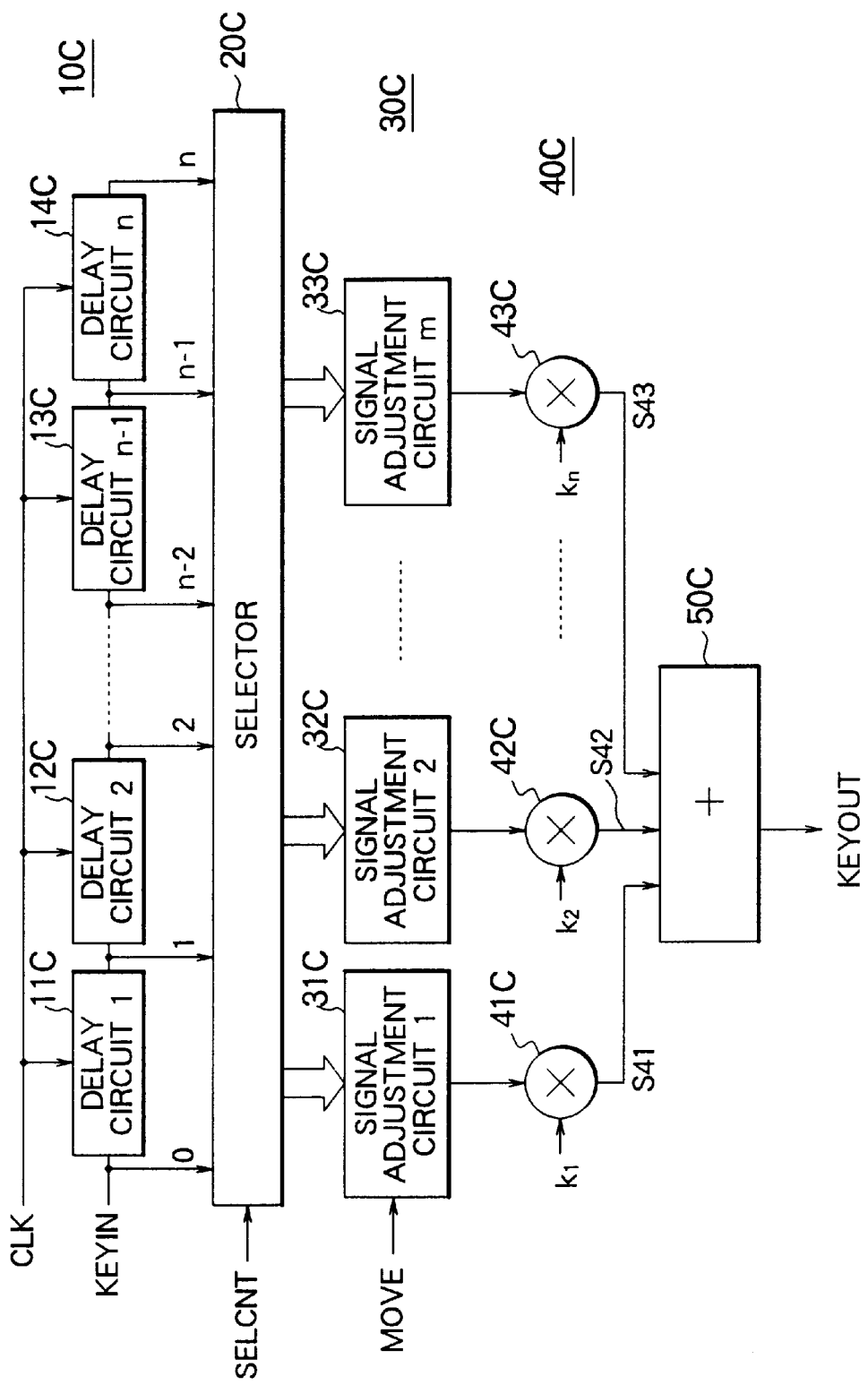
FIG. 27 is a view of the configuration of a key signal defocus apparatus of a fifth embodiment of the key signal processing apparatus for video signal processing of the present invention.

The configuration of a key signal defocusing apparatus is shown in FIG. 27 as a fifth embodiment of the key signal processing apparatus for video signal processing of the present invention.

The key signal defocusing apparatus shown in FIG. 27 is comprised of a key signal delay circuit 10C comprised of the unit clock delay circuits 11C to 14C, a signal selection circuit 20C, a signal adjustment unit 30C comprised of the signal adjustment circuits 31C to 33C, a signal multiplication unit 40C comprised of the multiplication circuits 41C to 43C, and a signal synthesization circuit 50C.

Figure 28:
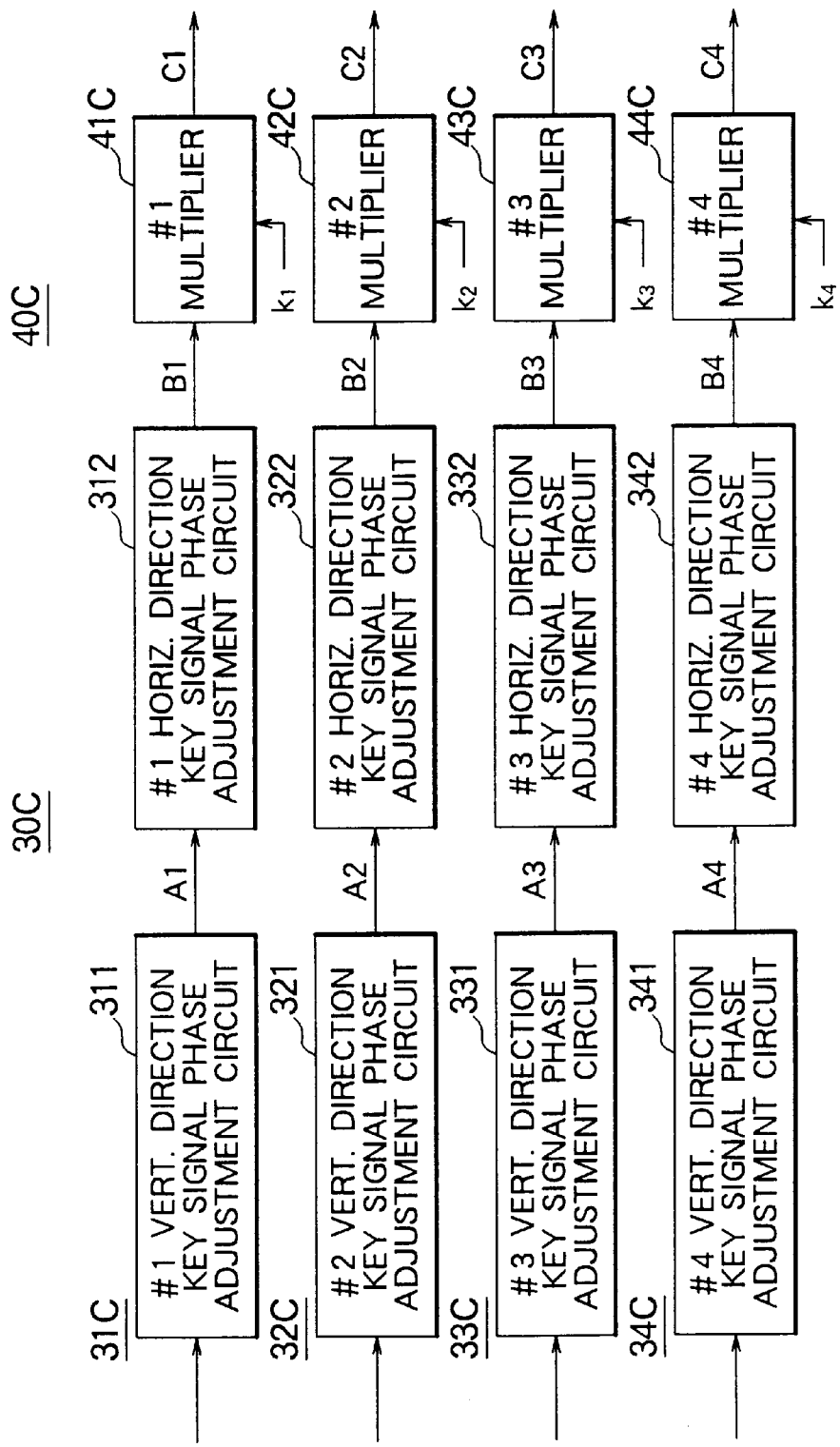
FIG. 28 is a view of the configuration of the signal adjustment circuit of FIG. 27.

The key signal defocusing apparatus illustrated in FIG. 27 and the phase adjustment circuit shown in FIG. 28 combine to form the key signal processing apparatus for video signal processing of the present embodiment. That is, the key signal delay circuit 10C of FIG. 27 is substantially the same as the key signal delay circuit 10A of FIG. 1, the signal selection circuit 20C of FIG. 27 is substantially the same as the matrix circuit 20A of FIG. 1 or the selector 110 of FIG. 12, and the signal synthesization circuit 50C of FIG. 27 is substantially the same as the signal synthesization circuit 40A of FIG. 1. However, the signal adjustment circuits 31C to 33C of the signal adjustment unit 30, as shown in FIG. 28, are each comprised of a first vertical direction signal adjustment circuit 311 and first horizontal direction signal adjustment circuit 312, a second vertical direction signal adjustment circuit 321 and second horizontal direction signal adjustment circuit 322, a third vertical direction signal adjustment circuit 331 and third horizontal direction signal adjustment circuit 332, and a fourth vertical direction signal adjustment circuit 341 and fourth horizontal direction signal adjustment circuit 342.

Note that in FIG. 27, m number of signal adjustment circuits 31C to 33C are shown, but in FIG. 8 just four are illustrated using m=4. In the following explanation, the description will be given of four sets. Accordingly, there are assumed to be four multiplication circuits (multipliers) in the signal multiplication unit 40C shown in FIG. 27 as illustrated in FIG. 28.

The operation of the key signal defocusing apparatus illustrated in FIG. 27 and FIG. 28 will be explained below referring to FIG. 29 to FIG. 32.

The key signals passing through the key signal delay circuit 10C and the signal selection circuit 20C and adjusted at the vertical direction signal adjustment circuits 311, 321, 331, and 341 (FIG. 28) in the signal adjustment unit 30C when the key input signal KEYIN illustrated in FIG. 29A is supplied to the key signal defocusing apparatus are illustrated in FIGS. 29F to 29I. Here, the longitudinal directions are made narrower.

The key signals adjusted at the horizontal direction signal adjustment circuits 312, 322, 332, and 342 (FIG. 28) are illustrated in FIGS. 29F to 29I. Here, the lateral directions are made narrower.

The results of weighting of the results of adjustment at the horizontal direction signal adjustment circuits 312, 322, 332, and 342 at the multipliers 41B to 44B shown in FIG. 28 are shown in FIGS. 30A to 30D.

Figure 30A:
Figure 30B:
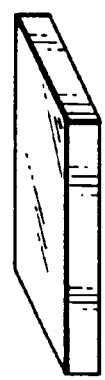
Figure 30C:
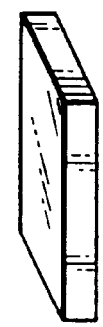
Figure 30D:
Figure 30E:
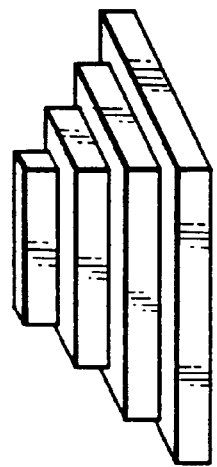

The result of addition of the results of the multipliers 41C to 44C at the signal synthesization circuit 50C, that is, the defocused key signal, is shown in FIG. 30E.

In the above signal processing, looking in one direction, for example, the vertical direction, the key input signal KEYIN shown in FIG. 31A is adjusted in the vertical direction in the vertical direction signal adjustment circuits 311, 321, 331, and 341 as shown by the waveforms shown in FIGS. 31B to 31D, then is weighted at the multiplication circuits 41C to 44C, and thereby becomes equivalent to the result KEYOUT of signal synthesization at the signal synthesization circuit 50C as shown in FIG. 31E. The defocused key output signal KEYOUT from the signal synthesization circuit 50C is smoother than the key input signal KEYIN.

Figure 32:
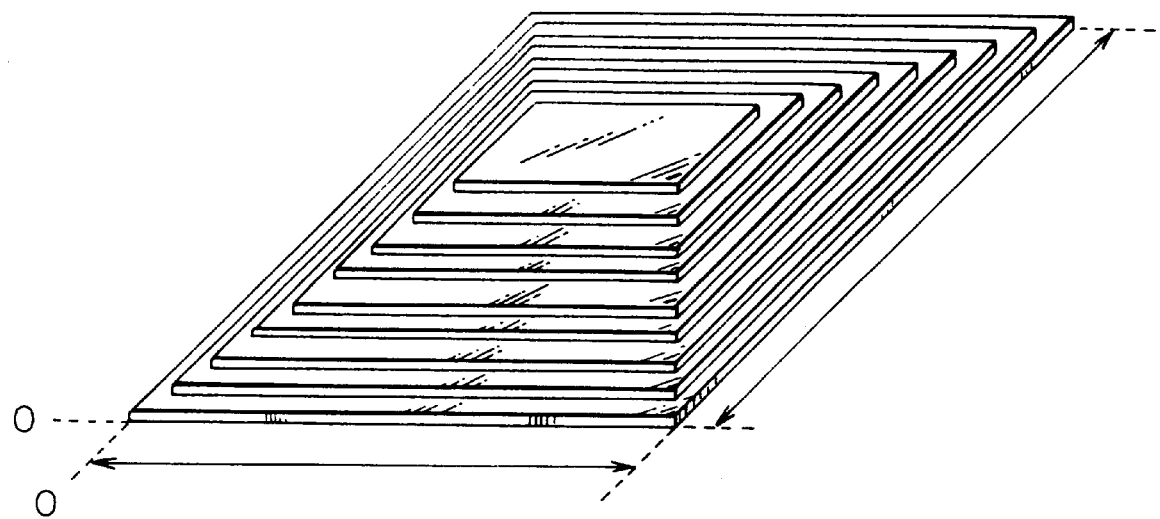
FIG. 32 is a perspective view of the defocused key signal showing three-dimensionally the results of FIGS. 31A to 31E.

Looking at the results three-dimensionally, as shown in FIG. 32, a defocused signal of a pyramid shape with smoothly inclined faces is obtained. The defocused key signal shown in FIG. 32, however, is not a four-stage one shown in FIG. 30E, but a more practical 10-stage one.

The key signal processing apparatus for video signal processing of the present invention is not limited to the above embodiments. Various modifications are possible. For example, it would be self-evident to a person skilled in the art to suitably combine the above embodiments. Corrections and modifications of the above embodiments would also be self-evident to a person skilled in the art.

According to the present invention, a key input signal can be adjusted at the sub-pixel level of less than a pixel size.

Further, according to the present invention, even if the times of two key signals are considerably different, the pulse width of the key signal can be adjusted without problem to the mode signal according to the mode.

Furthermore, according to invention, two signals obtained by adjusting a key signal at the sub-pixel level can be used to compose a signal in any mode.

Also, according to the present invention, it is possible to produce key signals suitable for softened borderline or softened drop-border.

Further, according to the present invention,the borderline of the key signal can be made wider.

Further, according to the present invention, when making a shadow of the key signal, the shadow can be lengthened.

Also, when the key signal processing apparatus for video signal processing of the present invention is used as a bandpass filter exhibiting effects in the vertical and horizontal directions of the key signal, the performance of the filter is improved.

Further, according to the present invention, the key signal processing apparatus for video signal processing can be realized as an IC. By connecting in cascade exactly the number of ICs needed, it is possible to easily perform the desired combination key signal processing.

Also, according to the present invention, it is possible to obtain a smoothly changing defocused signal.

What is claimed is:

1. A key signal processing apparatus for video signal processing comprising:

a selector for selecting and outputting a plurality of key input signals based on a selection control signal;

a plurality of key signal modification circuits which receive the key signals output from said selector and modify the waveforms of the key signals, each key signal modification circuit having, a signal delay circuit for successively delaying by a time unit corresponding to one horizontal synchronization period of the video signal at least one of the key input signals output from said selector and outputting a plurality of delayed key signals, a first direction signal adjustment unit which receives a key signal output from said selector and the plurality of delayed key signals from said signal delay circuit, selects a pair of signals in a predetermined delayed relationship for a first direction of the video signal, and adjusts the pulse widths of the signals for exactly a predetermined number of hierarchies for the first direction of the video signal for the selected signals, and a second direction signal adjustment unit which receives the results of the signal adjustment at the first direction signal adjustment unit and adjusts the pulse widths of the signals for exactly a predetermined number of hierarchies for the second direction of the video signal in an orthogonal relation with the first direction;

a multiplication unit which multiples a predetermined coefficient with a plurality of outputs of the plurality of key signal modification circuits; and a first signal synthesization circuit which forms a combined signal from the plurality of the results of multiplication of the multiplication unit.

2. A key signal processing apparatus for video signal processing as set forth in claim 1, wherein said first signal synthesization circuit has a circuit for performing positive non-additive (NAM) computations and negative NAM computations and these computations are performed based on a mode signal.

3. A key signal processing apparatus for video signal processing as set forth in claim 1, further comprising a first delay circuit which receives a key signal subjected to signal processing at another key signal processing apparatus for video signal processing and delays the same by exactly the time for computation required by said key signal modification circuits and said multiplication unit;

a second delay circuit for delaying the selected key signal from said selector by exactly the computation time required for the key signal modification circuits and the multiplication unit;

a switching circuit which selects the output of said first delay circuit or the output of said second delay circuit and outputs the same; and a second signal synthesization circuit which combines a signal from the results of said first signal synthesization circuit and the output of said first delay circuit or the output of said second delay circuit selected by said switching circuit.

4. A key signal processing apparatus for video signal processing as set forth in claim 3, wherein said second signal synthesization circuit has a circuit for performing positive NAM computations and negative NAM computations and these computations are performed based on a mode signal.

5. A key signal processing apparatus for video signal processing according to claim 1 further comprising a first line delay circuit means having a plurality of delay circuits for receiving a key input signal and giving a successive time delay corresponding to one line of the video signal; and wherein a first signal adjustment circuit means for receiving the plurality of delayed key signals delayed by said first line delay circuit means and the key input signal and performing adjustment on these key signals is formed from the selector; the plurality of key signal modification circuits each having the signal delay circuit, the first direction signal adjustment unit, and the second direction signal adjustment unit; the multiplication unit; the first signal synthesization circuit; a first delay circuit which receives a key signal subjected to signal processing at another key signal processing apparatus for video signal processing and delays the same by exactly the time for computation required by said key signal modification circuits and said multiplication unit; a second delay circuit for delaying the selected key signal from the selector hy exactly the computation time required for the key signal modification circuits and the multiplication unit; a switching circuit which selects the output of said first delay circuit or the output of said second delay circuit and outputs the same; and a second signal synthesization circuit which combines a signal from the results of said first signal synthesization circuit and the output of said first delay circuit or the output of said second delay circuit selected by said switching circuit.

6. A key signal processing apparatus for video signal processing as set forth in claim 5, further comprising:

a second line delay circuit means having a plurality of delay circuits for receiving an output of a key signal modification circuit of said key signal processing apparatus for video signal processing and giving a successive time delay corresponding to one line of the video signal;

a second signal adjustment circuit means for receiving a plurality of delayed key signals delayed by said second line delay circuit means and receiving the output of the key signal modification circuit of said key signal processing apparatus for video signal processing as the processed key signal of a previous stage of key signal processing apparatus for video signal processing and performing second adjustment on these key signals, which said second signal adjustment circuit means is provided with the following circuits:

a selector for selecting and outputting a plurality of key input signals based on a selection control signal;

a plurality of key signal modification circuits which receive the key signals output from said selector and modify the waveforms of the key signals, each key signal modification circuit having:

a signal delay circuit for successively delaying by a time unit corresponding to one horizontal synchronization period of the video signal a key input signal output from said selector and outputting a plurality of delayed key signals, a first direction signal adjustment unit which receives a key signal output from said selector and the plurality of delayed key signals from said signal delay circuit, selects a pair of signals in a predetermined delayed relationship for a first direction of the video signal, and adjusts the pulse width of the signals for exactly a predetermined number of hierarchies for the first direction of the video signal for the selected signals; and a second direction signal adjustment unit which receives the results of the signal adjustment at said first direction signal adjustment unit and adjusts the pulse widths of the signals for exactly a predetermined number of hierarchies for the second direction of the video signal in an orthogonal relation with the first direction;

a multiplication unit which multiplies a predetermined coefficient with the plurality of outputs of said plurality of key signal modification circuits;

a first signal synthesization circuit which combines a signal from the plurality of the results of multiplication of said multiplication unit;

a first delay circuit which receives a key signal subjected to signal processing at another key signal processing apparatus for video signal processing and delays the same by exactly the time for computation required by said key signal modification circuits and said multiplication unit;

a second delay circuit for delaying the selected key signal from said selector by exactly the computation time required for said key signal modification circuits and the multiplication unit;

a switching circuit which selects the output of said first delay circuit or the output of said second delay circuit and outputs the same; and a second signal synthesization circuit which combines a signal from the results of said first signal synthesization circuit and the output of said first delay circuit or the output of said second delay circuit selected by said switching circuit.

7. A key signal processing apparatus for video signal processing as set forth in claim 6, further comprising:

a 2-line delay circuit for giving a 2-line delay to the output of said second signal synthesization circuit of said first signal adjustment circuit means and a switching circuit for switching the output of said second signal synthesization circuit of said first signal adjustment circuit means and the output of said 2-line delay circuit and applying the output to said second signal adjustment circuit means as a key signal of the previous stage of key signal processing apparatus for video signal processing.

* * * * *